US011949061B2

(12) United States Patent
Takahashi et al.

(10) Patent No.: US 11,949,061 B2
(45) Date of Patent: *Apr. 2, 2024

(54) SECONDARY BATTERY AND ELECTRONIC DEVICE

(71) Applicant: SEMICONDUCTOR ENERGY LABORATORY CO., LTD., Atsugi (JP)

(72) Inventors: Minoru Takahashi, Nagano (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,759

(22) Filed: Aug. 31, 2022

(65) Prior Publication Data

US 2022/0416288 A1 Dec. 29, 2022

Related U.S. Application Data

(63) Continuation of application No. 16/925,617, filed on Jul. 10, 2020, now Pat. No. 11,444,311, which is a continuation of application No. 15/922,969, filed on Mar. 16, 2018, now Pat. No. 10,714,784, which is a continuation of application No. 14/722,939, filed on May 27, 2015, now Pat. No. 9,960,446.

(30) Foreign Application Priority Data

| May 29, 2014 | (JP) | 2014-111114 |
| Jun. 27, 2014 | (JP) | 2014-133121 |
| Dec. 26, 2014 | (JP) | 2014-264017 |
| Jan. 14, 2015 | (JP) | 2015-005404 |

(51) Int. Cl.
| *H01M 10/04* | (2006.01) |
| *H01G 9/048* | (2006.01) |
| *H01G 9/145* | (2006.01) |
| *H01M 50/105* | (2021.01) |
| *H01M 50/116* | (2021.01) |
| *H01M 50/119* | (2021.01) |
| *H01M 50/121* | (2021.01) |
| *H01M 50/122* | (2021.01) |
| *H01M 50/124* | (2021.01) |
| *H01M 50/136* | (2021.01) |
| *H01G 11/78* | (2013.01) |

(52) U.S. Cl.
CPC ........ *H01M 10/0436* (2013.01); *H01G 9/048* (2013.01); *H01G 9/145* (2013.01); *H01M 50/105* (2021.01); *H01M 50/116* (2021.01); *H01M 50/119* (2021.01); *H01M 50/121* (2021.01); *H01M 50/122* (2021.01); *H01M 50/124* (2021.01); *H01M 50/136* (2021.01); *H01G 11/78* (2013.01); *H01M 2220/20* (2013.01); *H01M 2220/30* (2013.01); *Y02E 60/13* (2013.01); *Y02T 10/70* (2013.01)

(58) Field of Classification Search
CPC ............. H01G 11/78; H01M 10/0436; H01M 50/105; H01M 50/116; H01M 50/119; H01M 50/121; H01M 50/122; H01M 50/124; H01M 50/136; H01M 2220/20; H01M 2220/30; Y02E 60/10; Y02E 60/13; Y02P 70/50; Y02T 10/70
See application file for complete search history.

(56) References Cited

U.S. PATENT DOCUMENTS

| 4,680,724 | A | 7/1987 | Sugiyama et al. |
| 6,506,523 | B1 * | 1/2003 | Hatazawa ......... H01M 10/0565 429/316 |
| 6,599,659 | B1 | 7/2003 | Endo et al. |
| 6,664,005 | B2 | 12/2003 | Kezuka et al. |
| 7,764,046 | B2 | 7/2010 | Osada |
| 7,944,172 | B2 | 5/2011 | Osada |
| 8,192,863 | B2 | 6/2012 | Best et al. |
| 8,268,661 | B2 | 9/2012 | Doi et al. |
| 8,334,068 | B2 | 12/2012 | Takeuchi et al. |
| 8,785,030 | B2 | 7/2014 | Ueda |
| 8,802,286 | B2 | 8/2014 | Konishiike et al. |
| 8,847,556 | B2 | 9/2014 | Osada |
| 9,960,446 | B2 | 5/2018 | Takahashi et al. |

(Continued)

FOREIGN PATENT DOCUMENTS

| CN | 001947279 A | 4/2007 |
| CN | 102047498 A | 5/2011 |

(Continued)

OTHER PUBLICATIONS

Machine translation of DE102012213111, published on Jan. 30, 2014 (Year: 2012).*
International Search Report (Application No. PCT/IB2015/053509) dated Jul. 21, 2015.
Written Opinion (Application No. PCT/IB2015/053509) dated Jul. 21, 2015.

(Continued)

*Primary Examiner* — Anca Eoff
(74) *Attorney, Agent, or Firm* — NIXON PEABODY LLP; Jeffrey L. Costellia

(57) ABSTRACT

A secondary battery, suitable for a portable information terminal or a wearable device is provided. An electronic device having a novel structure which can have various forms and a secondary battery that fits the forms of the electronic device are provided. In the secondary battery, sealing is performed using a film provided with depressions or projections that ease stress on the film due to application of external force. A pattern of depressions or projections is formed on the film by pressing, e.g., embossing.

6 Claims, 25 Drawing Sheets

(56) References Cited

U.S. PATENT DOCUMENTS

| | | |
|---|---|---|
| 10,050,301 B2 | 8/2018 | Kang et al. |
| 2005/0088365 A1 | 4/2005 | Yamazaki et al. |
| 2009/0023062 A1* | 1/2009 | Kim .............. H01M 10/045 |
| | | 429/163 |
| 2012/0040239 A1 | 2/2012 | Takahashi et al. |
| 2012/0202101 A1 | 8/2012 | Ueda |
| 2013/0101884 A1 | 4/2013 | Ueda |
| 2013/0134051 A1 | 5/2013 | Takahashi et al. |
| 2013/0177798 A1 | 7/2013 | Ueda |
| 2013/0224562 A1 | 8/2013 | Momo |
| 2013/0252088 A1 | 9/2013 | Kuriki et al. |
| 2013/0252089 A1 | 9/2013 | Kuriki |
| 2013/0273405 A1 | 10/2013 | Takahashi et al. |
| 2014/0354558 A1 | 12/2014 | Cho et al. |
| 2015/0111088 A1 | 4/2015 | Hiroki et al. |
| 2015/0140397 A1 | 5/2015 | Tajima et al. |
| 2015/0325820 A1 | 11/2015 | Sohn et al. |

FOREIGN PATENT DOCUMENTS

| | | |
|---|---|---|
| CN | 102376902 A | 3/2012 |
| CN | 102522595 A | 6/2012 |
| CN | 102959760 A | 3/2013 |
| CN | 103824986 A | 5/2014 |
| DE | 102012213111 | 1/2014 |
| EP | 1744384 A | 1/2007 |
| EP | 2352203 A | 8/2011 |
| EP | 3096386 A | 11/2016 |
| JP | 58-197655 A | 11/1983 |
| JP | 59-189554 A | 10/1984 |
| JP | 07-006771 A | 1/1995 |
| JP | 11-154495 A | 6/1999 |
| JP | 11-283672 A | 10/1999 |
| JP | 2000-173559 A | 6/2000 |
| JP | 2001-052660 A | 2/2001 |
| JP | 2001-093581 A | 4/2001 |
| JP | 2001-266894 A | 9/2001 |
| JP | 2002-063938 A | 2/2002 |
| JP | 2003-288863 A | 10/2003 |
| JP | 2005-108747 A | 4/2005 |
| JP | 2005-157317 A | 6/2005 |
| JP | 2005-332591 A | 12/2005 |
| JP | 2006-049054 A | 2/2006 |
| JP | 2006-172773 A | 6/2006 |
| JP | 2006-331874 A | 12/2006 |
| JP | 2007-066619 A | 3/2007 |
| JP | 2007-207439 A | 8/2007 |
| JP | 2007-234466 A | 9/2007 |
| JP | 2009-016275 A | 1/2009 |
| JP | 2009-117255 A | 5/2009 |
| JP | 2009-533831 | 9/2009 |
| JP | 2011-100623 A | 5/2011 |
| JP | 2012-113843 A | 6/2012 |
| JP | 2013-025980 A | 2/2013 |
| JP | 2013-048041 A | 3/2013 |
| JP | 2013-048042 A | 3/2013 |
| JP | 2014-060016 A | 4/2014 |
| JP | 5753258 | 7/2015 |
| JP | 2017-503319 | 1/2017 |
| WO | WO-2007/118281 | 10/2007 |
| WO | WO-2012/001885 | 1/2012 |
| WO | WO-2012/140707 | 10/2012 |
| WO | WO-2012/140709 | 10/2012 |
| WO | WO-2015/105303 | 7/2015 |

OTHER PUBLICATIONS

Chinese Office Action (Application No. 201580028117.3) dated Nov. 28, 2018.

* cited by examiner

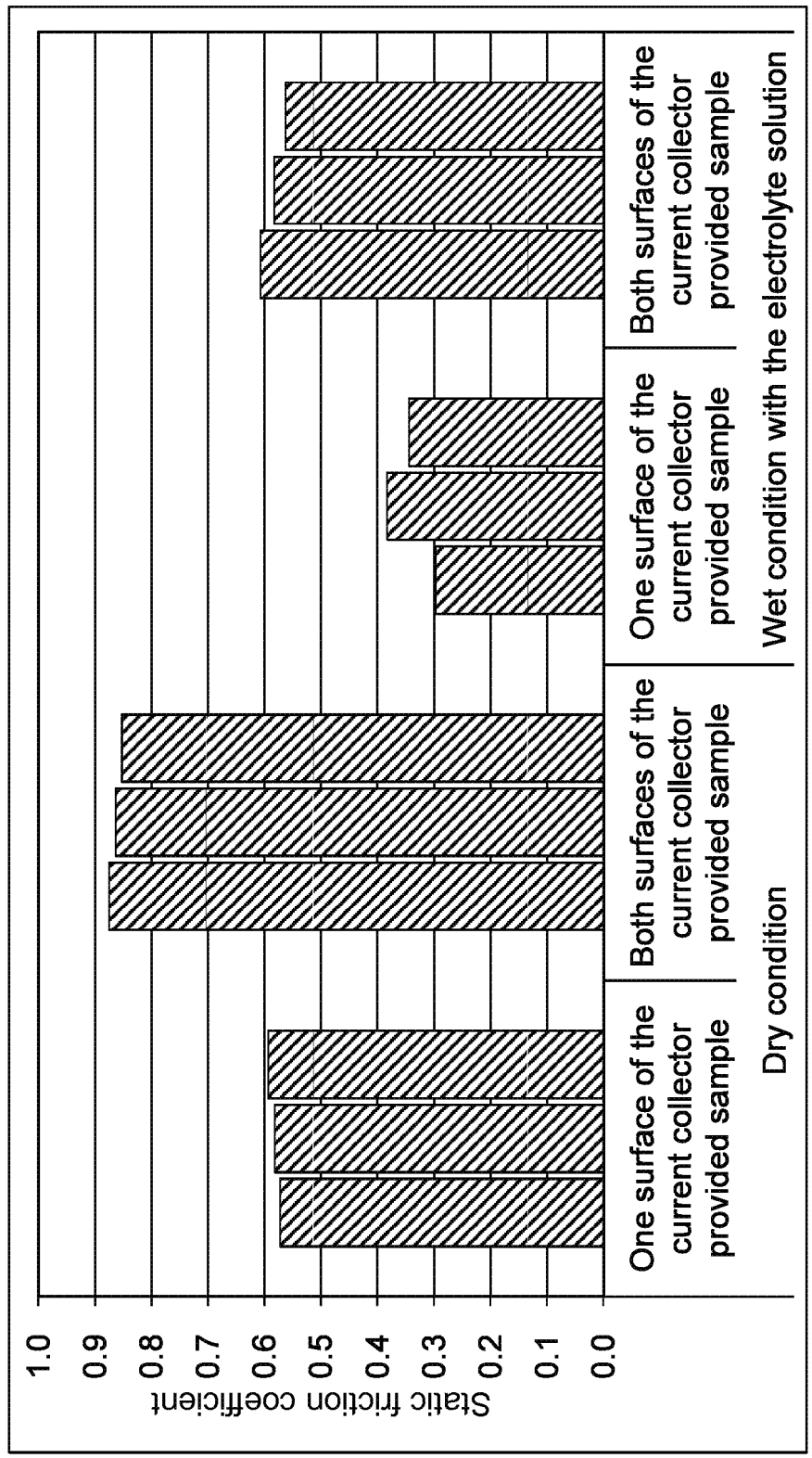

SECONDARY BATTERY AND ELECTRONIC DEVICE

This application is a Continuation of prior U.S. patent application Ser. No. 16/925,617 filed Jul. 10, 2020, now U.S. Pat. No. 11,444,311, which is Continuation of U.S. patent application Ser. No. 15/922,969 filed on Mar. 16, 2018, now U.S. Pat. No. 10,714,784, which is a Continuation of prior U.S. patent application Ser. No. 14/722,939, filed on May 27, 2015, now U.S. Pat. No. 9,960,446, which claims priority from the foreign application numbers Japanese Patent Application No. 2014-111114 filed on May 29, 2014, Japanese Patent Application No. 2014-133121 filed on Jun. 27, 2014, Japanese Patent Application No. 2014-264017 filed on Dec. 26, 2014, and Japanese Patent Application No. 2015-005404 filed on Jan. 14, 2015, the entire contents of which are hereby incorporated by reference.

TECHNICAL FIELD

The present invention relates to an object, a method, or a manufacturing method. The present invention relates to a process, a machine, manufacture, or a composition of matter. One embodiment of the present invention relates to a semiconductor device, a display device, a light-emitting device, a power storage device, an imaging device, a driving method thereof, or a manufacturing method thereof. In particular, one embodiment of the present invention relates to an electronic device.

Note that electronic devices in this specification mean all devices including secondary batteries, and electro-optical devices including secondary batteries, information terminal devices including secondary batteries, vehicles including secondary batteries, and the like are all electronic devices.

BACKGROUND ART

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a goggle-type display device that includes a CPU and is capable of data communication. The device disclosed in Patent Document 1 is also a kind of electronic device.

Most wearable devices and portable information terminals include secondary batteries that can be repeatedly charged and discharged, and have problems in that there is a limitation on the operation time of the wearable devices and the portable information terminals because their light weight and compactness cost the battery capacity. Secondary batteries used in wearable devices and portable information terminals should be lightweight and compact and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

Electrodes serving as positive electrodes or negative electrodes of lithium-ion secondary batteries are each formed using, for example, a lithium metal, a carbon-based material, or an alloy-based material.

REFERENCE

Patent Document

[Patent Document 1] Japanese Published Patent Application No. 2005-157317

DISCLOSURE OF INVENTION

An object is to provide a secondary battery suitable for a portable information terminal.

Another object is to provide a secondary battery suitable for a wearable device.

Another object is to provide an electronic device having a structure which can have various forms and a secondary battery that fits the forms of the electronic device. Another object is to provide a novel electronic device, a novel secondary battery, or a novel power storage device.

Note that the descriptions of these objects do not preclude the existence of other objects. In one embodiment of the present invention, there is no need to achieve all the objects. Other objects will be apparent from and can be derived from the descriptions of the specification, the drawings, the claims, and the like.

In the case where an electronic device is formed to have a complicated form, a housing is designed to have a complicated form and electronic components (e.g., a power source, a wiring, a transistor, a resistor, and a capacitor) are arranged in an internal space of the housing. When it does not matter how large and heavy the electronic device is, the volume of the internal space of the housing is relatively large; thus, the electronic components can be arranged relatively freely.

In the case where an electronic device having a complicated form is required to be compact and lightweight, the volume of an internal space of a housing is small, and electronic components and the sizes thereof are selected according to the volume and the electronic components are arranged. In this case, the manufacturing cost is increased because smaller electronic components are more expensive.

Moreover, as the volume or weight of a secondary battery increases, the capacity thereof tends to increase. Therefore, there are limitations on the size and arrangement of a secondary battery that is incorporated in a small electronic device.

An increase in the mileage per charge of a vehicle using a secondary battery such as an electric vehicle and a hybrid vehicle increases the volume or weight of the secondary battery.

In view of the above, a secondary battery that can be changed in form is used for an electronic device and the secondary battery and other electronic components are arranged with efficiency in the internal space of a housing of the electronic device.

In the case where a secondary battery is changed in form by externally applying force, the force is externally applied to an object such as a film used as an exterior body of the secondary battery and the object is stressed. This might partly deform or damage the object.

A secondary battery that can relieve a strain caused by stress is provided. A "strain" is the scale of change in form indicating the displacement of a point of an object relative to the reference (initial) length of the object. A secondary battery that can reduce the influence of a strain, that is, the scale of change in form caused by application of external force to the secondary battery, to an acceptable level is provided.

One embodiment of the invention disclosed in this specification is a secondary battery in which sealing is performed using a film provided with depressions or projections that eases stress on the film due to application of external force.

Another embodiment of the invention disclosed in this specification is a secondary battery in which sealing is performed using a film having a pattern of depressions or projections on part of a surface.

Another embodiment of the invention disclosed in this specification is a secondary battery in which sealing is performed by attaching a first film having a pattern of depressions or projections on part of a surface to a second film having a pattern of depressions or projections different from that of the first film on part of a surface.

(1) Another embodiment of the invention disclosed in this specification is a secondary battery including a film that is used for sealing. The film has a region with a pattern of depressions or projections and a region without the pattern of depressions or projections. The region with the pattern includes a portion having a first thickness and a portion having a second thickness.

(2) Another embodiment of the invention disclosed in this specification is a secondary battery including a film that is used for sealing. The film has a region with a pattern of depressions or projections and a region without the pattern of depressions or projections. The region with the pattern includes a portion having a first thickness and a portion having a second thickness. The portion having the first thickness is provided with depressions or projections with a first pitch and the portion having the second thickness is provided with depressions or projections with a second pitch. Note that a "pitch" refers to the distance between bottoms of adjacent depressions or tops of adjacent projections seen from the top.

(3) Another embodiment of the invention disclosed in this specification is the secondary battery of (1) or (2) including a boundary between the region with the pattern of depressions or projections and the region without the pattern of depressions or projections.

(4) Another embodiment of the invention disclosed in this specification is a secondary battery including a film that is used for sealing. The film has a first pattern of depressions or projections. The film includes a portion having a first thickness and a portion having a second thickness. The film has a second pattern of depressions or projections. The film includes a portion having a third thickness and a portion having a fourth thickness. The first pattern is formed by the portion having the first thickness and the portion having the second thickness. The second pattern is formed by the portion having the third thickness and the portion having the fourth thickness.

(5) Another embodiment of the invention disclosed in this specification is a secondary battery including a film that is used for sealing. The film has a first pattern of depressions or projections. The film includes a portion having a first thickness and a portion having a second thickness. The film has a second pattern of depressions or projections. The film includes a portion having a third thickness and a portion having a fourth thickness. The portion having the first thickness is provided with depressions or projections with a first pitch. The portion having the third thickness is provided with depressions or projections with a second pitch.

(6) Another embodiment of the invention disclosed in this specification is the secondary battery of (4) or (5) including a boundary between the first pattern of depressions or projections and the second pattern of depressions or projections.

(7) Another embodiment of the invention disclosed in this specification is a secondary battery including a first film and a second film that are used for sealing. The first film has a region with a pattern of depressions or projections and the second film has a region without the pattern of depressions or projections. The region with the pattern includes a portion having a first thickness and a portion having a second thickness.

(8) Another embodiment of the invention disclosed in this specification is a secondary battery including a first film and a second film that are used for sealing. The first film has a region with a pattern of depressions or projections and the second film has a region without the pattern of depressions or projections. The region with the pattern includes a portion having a first thickness and a portion having a second thickness. The portion having the first thickness is provided with depressions or projections with a first pitch and the portion having the second thickness is provided with depressions or projections with a second pitch.

(9) Another embodiment of the invention disclosed in this specification is the secondary battery of (7) or (8) including at least a positive electrode active material layer, a negative electrode active material layer, and an electrolyte solution between the first film and the second film.

(10) Another embodiment of the invention disclosed in this specification is the secondary battery of (2) or (8) in which the first pitch is different from the second pitch.

(11) Another embodiment of the invention disclosed in this specification is the secondary battery of (2) or (8) in which the depths of depressions with the first pitch or the heights of projections with the first pitch and the depths of depressions with the second pitch or the heights of projections with the second pitch are smaller than half the thickness of the secondary battery.

(12) Another embodiment of the invention disclosed in this specification is a secondary battery including a first film and a second film that are used for sealing. The first film has a first pattern of depressions or projections. The first film includes a portion having a first thickness and a portion having a second thickness. The second film has a second pattern of depressions or projections. The second film includes a portion having a third thickness and a portion having a fourth thickness. The first pattern is formed by the portion having the first thickness and the portion having the second thickness. The second pattern is formed by the portion having the third thickness and the portion having the fourth thickness.

(13) Another embodiment of the invention disclosed in this specification is a secondary battery including a first film and a second film that are used for sealing. The first film has a first pattern of depressions or projections. The first film includes a portion having a first thickness and a portion having a second thickness. The second film has a second pattern of depressions or projections. The second film includes a portion having a third thickness and a portion having a fourth thickness. The portion having the first thickness is provided with depressions or projections with a first pitch. The portion having the third thickness is provided with depressions or projections with a second pitch.

(14) Another embodiment of the invention disclosed in this specification is the secondary battery of (12) or (13) including at least a positive electrode active material layer, a negative electrode active material layer, and an electrolyte solution between the first film and the second film.

(15) Another embodiment of the invention disclosed in this specification is the secondary battery of (5) or (13) in which the first pattern of depressions or projections is formed by the portion having the first thickness and the portion having the second thickness. The second pattern of depressions or projections is formed by the portion having the third thickness and the portion having the fourth thickness.

(16) Another embodiment of the invention disclosed in this specification is the secondary battery of (5) or (13) in which the depths of depressions with the first pitch or the heights of projections with the first pitch and the depths of depressions with the second pitch or the heights of projections with the second pitch are smaller than half the thickness of the secondary battery.

In any of the above structures, the pattern of the film is a visually recognizable geometric pattern in which lines slanted in two directions cross each other. In the case of such a geometric pattern in which lines slanted in two directions cross each other, stress due to bending can be relieved in at least two directions. The depressions or projections are not necessarily arranged regularly and may be arranged randomly. Random arrangement enables stress due to two-dimensional bending, stress due to three-dimensional random bending, or stress due to twisting to be relieved. The film may include a plurality of regions having different patterns. For example, the film may be provided with different patterns in the end portion and at the center, providing one film with two types of patterns. Alternatively, the film may be provided with three or more types of patterns. The film may be provided with depressions or projections only in a bendable portion and may have a flat surface in the other portion. Note that there is no particular limitation on the shapes of depressions or projections.

The depressions or projections of the film can be formed by pressing (e.g., embossing). The depressions or projections formed on a surface (or on the back) of the film by embossing form an enclosed space that is sealed by the film serving as a part of a wall of the sealing structure and whose inner volume is variable. This enclosed space can be regarded to have an accordion structure (bellows structure) formed by the film with the pattern of depressions or projections. The sealing structure using the film can prevent entry of water and dust. Note that embossing, which is a kind of pressing, is not necessarily employed and a method that allows formation of a relief on part of the film can be employed. A combination of the methods, for example, embossing and any other pressing may be performed on one film. Alternatively, embossing may be performed on one film more than once.

Although the secondary battery can have any of a variety of structures, a structure where a film is used as an exterior body is employed here. The film needs to have water resistance and gas resistance. Note that the film used as the exterior body is a single-layer film selected from a metal film (e.g., a foil of a metal or an alloy such as aluminum, stainless steel, nickel steel, gold, silver, copper, titanium, nichrome, iron, tin, tantalum, niobium, molybdenum, zirconium, or zinc), a plastic film made of an organic material, a hybrid material film containing an organic material (e.g., an organic resin or fiber) and an inorganic material (e.g., ceramic), and a carbon-containing inorganic film (e.g., a carbon film or a graphite film) or a stacked-layer film including two or more of the above films. A metal film is easy to be embossed. Forming depressions or projections by embossing increases the surface area of the film exposed to outside air, achieving efficient heat dissipation.

The sealing structure of the secondary battery is as follows: one rectangular film is folded in half such that two end portions overlap with each other and is sealed on three sides with an adhesive layer, or two films are stacked so as to overlap with each other and is sealed on four sides, which are end portions of the film, with an adhesive layer.

The adhesive layer can be formed using a thermoplastic film material, a thermosetting adhesive, an anaerobic adhesive, a photo-curable adhesive such as a UV curable adhesive, or a reactive curable adhesive. Examples of materials of the adhesives include an epoxy resin, an acrylic resin, a silicone resin, and a phenol resin.

In forming the sealing structure by bonding and fixing the adhesive layer and the film, pressure bonding is performed. The depths of the depressions or the heights of the projections are made different between an end portion of the film, which is subjected to pressure bonding, and a center portion of the film. When the depths of the depressions or the heights of the projections in the end portion of the film are smaller than the depths of the depressions or the heights of the projections in the center portion of the film, the influence of a strain can be reduced to be within the allowable range.

In the case where a film is provided with depressions or projections in a center portion and not provided with depressions or projections in an end portion subjected to pressure bonding, the secondary battery can greatly expand when the volume of internal components of the secondary battery expands in the center portion. That is, such a film can prevent explosion of the secondary battery. On the other hand, because of absence of depressions or projections in the end portion, flexibility of the end portion is lower than that in the center portion and stress is less likely to be relieved in the end portion than in the center portion. Therefore, providing depressions or projections also in the end portion of the film helps reduce the influence of a strain to an acceptable level.

The term "electronic device having a complicated form" can be interpreted in many ways. It can be interpreted as an electronic device having a fixed complicated form (e.g., the form having a curved surface). In the case of fixing the form of the electronic device, a secondary battery is bent once and fixed while being bent. In addition, the term can also be interpreted as an electronic device having a complicated form that changes or does not change its form when external force is applied or an electronic device having a simple form that changes its form when external force is applied. In the case of an electronic device that changes its form when force is applied, it is preferable that a secondary battery also be able to change its form every time force is applied.

One embodiment of the invention disclosed in this specification is an electronic device including a housing partly having a curved surface and a secondary battery having a curved surface. An exterior body of the secondary battery is a film whose surface partly has a pattern formed by depressions or projections.

Another embodiment of the invention disclosed in this specification is an electronic device including a housing and a secondary battery in contact with part of the housing. An exterior body of the secondary battery is a film whose surface partly has a pattern formed by depressions or projections. The housing can partly change its form.

In the above structure, the exterior body of the secondary battery can change its form in the range of radius of curvature from 10 mm to 150 mm, preferably from 30 mm to 150 mm. One or two films are used as the exterior body of the secondary battery. In the case where the secondary battery has a layered structure and the secondary battery has an arc-formed cross section by bending the secondary battery, the secondary battery has a structure where electrodes, an electrolyte solution, and the like are sandwiched between two curved surfaces of the films.

A description is given of the radius of curvature of a surface with reference to FIGS. 1A to 1C. In FIG. 1A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center of curvature 1704. FIG. 1B is a top view of the curved surface 1700. FIG. 1C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a secondary battery in which electrodes and an electrolyte solution 1805 and the like are sandwiched between two films as exterior bodies, a radius 1802 of curvature of a film 1801 close to a center of curvature 1800 of the secondary battery is smaller than a radius 1804 of curvature of a film 1803 far from the center of curvature 1800 (FIG. 2A). When the secondary battery is bent and has an arc-shaped cross section, tensile stress is applied to a surface of the film on the side farther from the center of curvature 1800 (FIG. 2B). However, by forming a pattern including projections or depressions on surfaces of the exterior bodies, the influence of a strain can be reduced to be acceptable even when tensile stress is applied. For this reason, the secondary battery can change its form such that the exterior body on the side closer to the center of curvature has a curvature radius greater than or equal to 10 mm, preferably greater than or equal to 30 mm.

Note that the cross-sectional shape of the secondary battery is not limited to a simple arc shape, and the cross section can be partly arc-shaped as illustrated in FIG. 2C.

When the bent secondary battery is seen in cross section, the outside surface is stretched and the inside surface is compressed. In other words, the outside surface expands and the inside surface contracts.

An optimum pattern of depressions or projections formed on a film that is the exterior body can prevent deterioration or breakage of the film due to a wrinkle or a crack formed by bending of a secondary battery and thus can prevent leakage of an electrolyte solution.

Part of a device like a watch is brought in contact with part of the body (wrist or arm) of a user, that is, the user wears the device, whereby the user can feel like the device is lighter than the actual weight. The use of a flexible secondary battery in an electronic device having a form with a curved surface that fits part of the body of a user allows the secondary battery to be fixed so as to have a form suitable to the electronic device and provided.

When a user moves part of the body on which an electronic device is worn, the user might feel uncomfortable, regard the electronic device as a distraction, and feel stress even in the case where the electronic device has a curved surface that fits part of the body. In the case where at least part of an electronic device can be changed in form according to movement of a body of a user, the user does not feel uncomfortable and a flexible battery can be provided in a portion of the electronic device that can be changed in form.

An electronic device does not necessarily have a form with a curved surface or a complicated form; an electronic device may have a simple form. For example, the number or size of components that can be incorporated in an electronic device with a simple form is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of wearable devices include devices that store data, send data, and receive data, typically, a portable information terminal and a memory.

A secondary battery having a novel structure can be provided. A novel power storage device can be provided.

The form of a secondary battery can be freely designed and when a secondary battery having a curved surface is used for example, the design flexibility of a whole device is increased and devices having a variety of designs can be fabricated. Furthermore, a secondary battery is provided inside and along a curved surface of a device with the least wasted space in the device having the curved surface, whereby it is possible to make maximum use of a space in the device.

Thus, an electronic device having a novel structure can be provided.

Note that the description of these effects does not preclude the existence of other effects. One embodiment of the present invention does not have to achieve all the effects listed above. Other effects will be apparent from and can be derived from the description of the specification, the drawings, the claims, and the like.

BRIEF DESCRIPTION OF DRAWINGS

FIGS. 14A to 14I1 illustrate electronic devices including flexible secondary batteries.

FIG. 18 is a graph showing friction data in Example 1.

BEST MODE FOR CARRYING OUT THE INVENTION

Figure 1A:
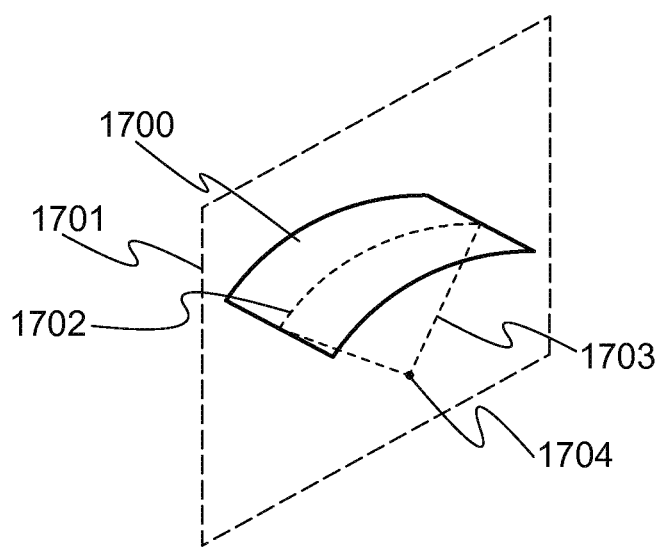
FIGS. 1A to 1C illustrate a radius of curvature of a surface.
Figure 1B:
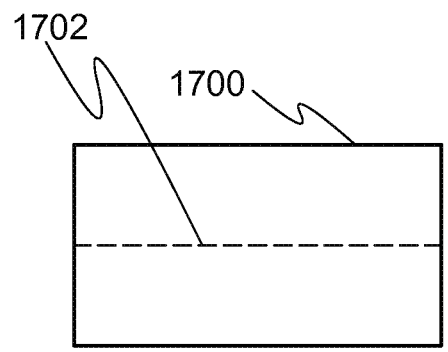
Figure 1C:
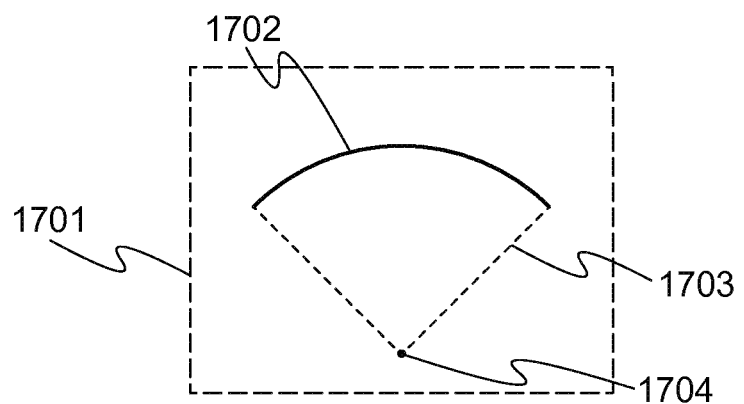
Figure 2A:
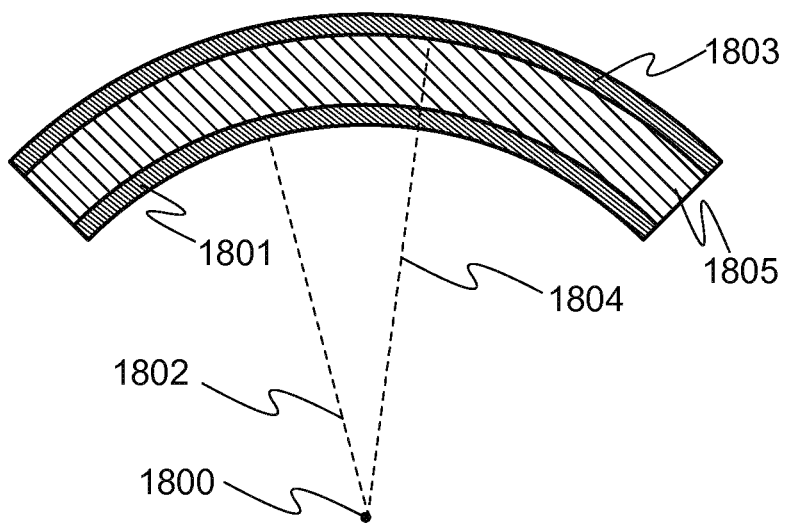
FIGS. 2A to 2C illustrate a center of curvature.
Figure 2B:
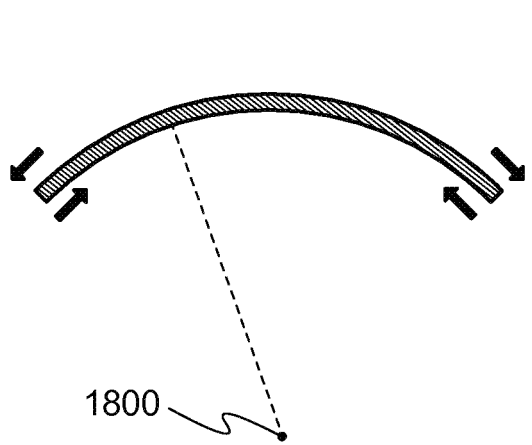
Figure 2C:
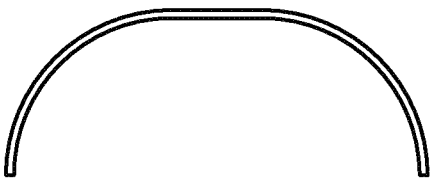

Embodiments and examples of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments and the examples.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for simplification. Therefore, the disclosed invention is not necessarily limited to the position, size, range, or the like disclosed in the drawings and the like.

The ordinal number such as "first", "second", and "third" are used to avoid confusion among components.

Note that the terms "film" and "layer" can be interchanged with each other depending on the case or circumstances. For example, the term "conductive layer" can be changed into the term "conductive film" in some cases. In addition, the term "insulating film" can be changed into the term "insulating layer" in some cases.

Embodiment 1

In this embodiment, an example of fabricating a lithium-ion secondary battery with the use of a film having an embossed pattern will be described with reference to FIGS. 3A to 3C, FIGS. 4A and 4B, FIGS. 5A to 5F, FIGS. 6A to 6F, FIGS. 7A to 7C, FIGS. 8A to 8D, and FIGS. 9A to 9C.

First, a sheet made of a flexible material is prepared. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-resistant polypropylene film and a polypropylene film is used as the sheet. This sheet is cut to obtain a film 10 illustrated in FIG. 3A.

Figure 3A:
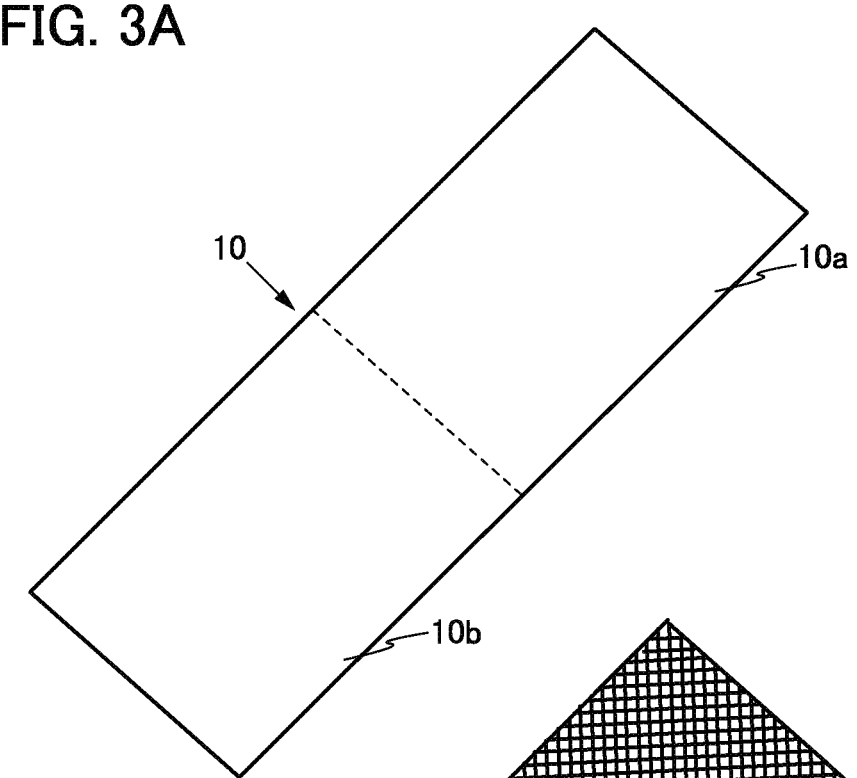
FIGS. 3A to 3C are top views each illustrating one embodiment of the present invention.
Figure 3B:
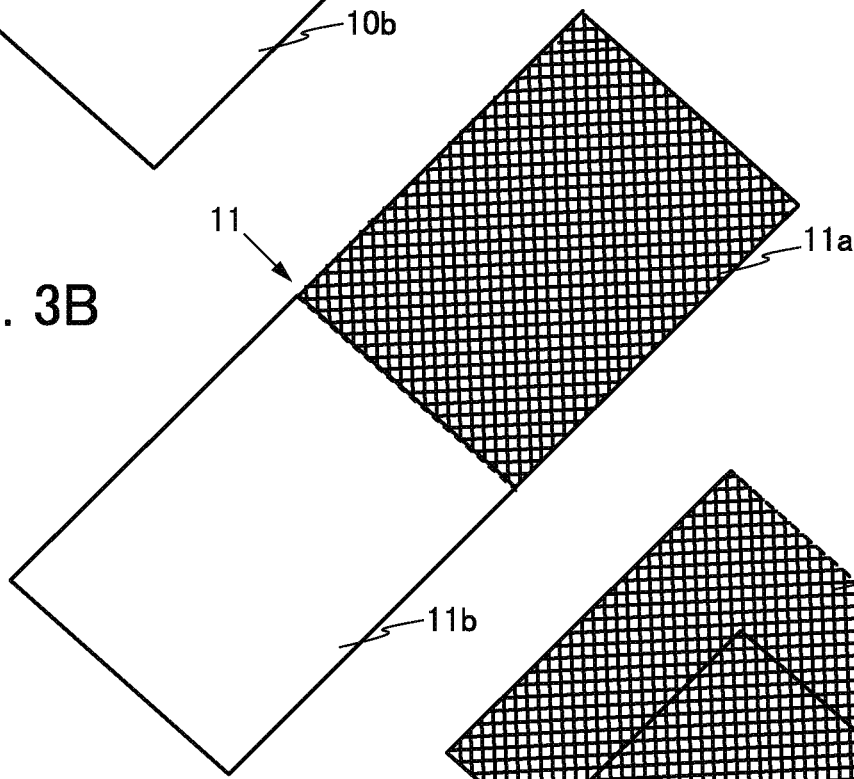

A film 10a of the film 10 is embossed and a film 10b is not embossed; as a result, a film 11 illustrated in FIG. 3B is formed. As illustrated in FIG. 3B, projections and depressions are formed to provide a film 11a a surface of which is provided with a visually recognizable pattern and a film 11b a surface of which is not provided with projections and depressions. There is a boundary between the film 11a provided with projections and depressions and the film 11b not provided with projections and depressions. In FIG. 3B, the film 11a is an embossed portion of the film 11, and the film 11b is a non-embossed portion. Note that embossing for the film 11a may be performed to provide the same projections and depressions on the entire surface, or may be performed to provide two or more types of projections and depressions on the film 11a. In the latter case, a boundary is formed between any two different types of projections and depressions.

Figure 4A:
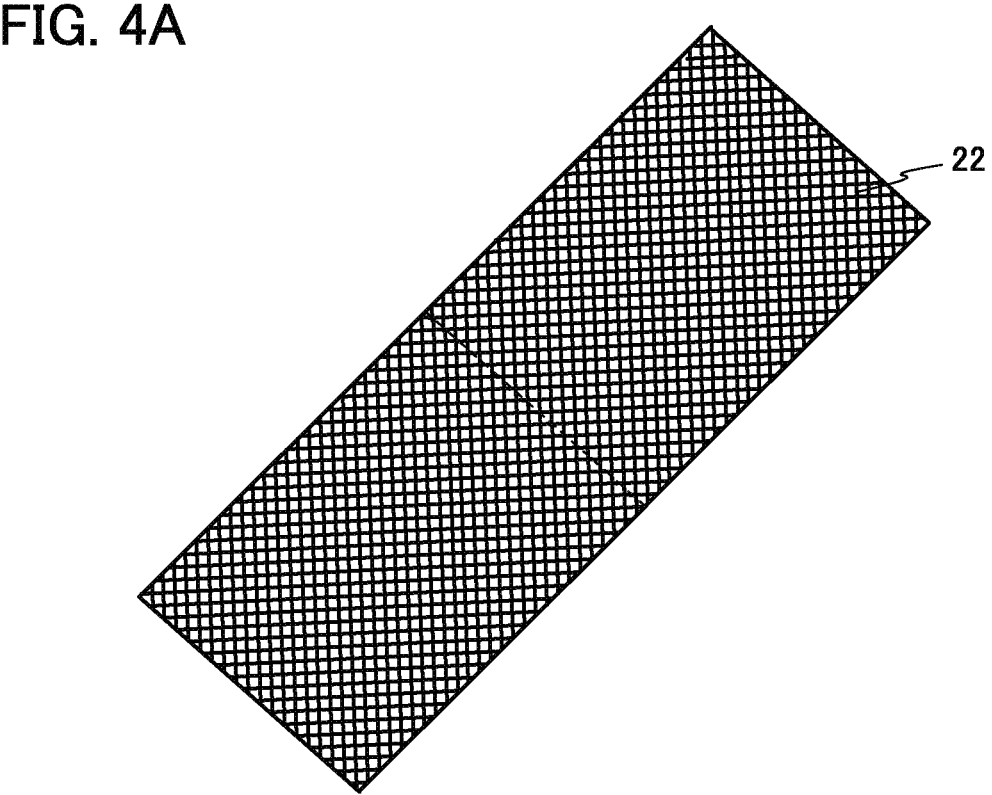
FIGS. 4A and 4B are top views each illustrating one embodiment of the present invention.

Alternatively, the entire film 10 in FIG. 3A may be embossed to form a film 22 as illustrated in FIG. 4A. Note that embossing may be performed to provide the same projections and depressions on the entire film 22, or may be performed to provide two or more types of projections and depressions on the film 22. In the latter case, a boundary is formed between any two different types of projections and depressions.

Although an example where the sheet is cut and then embossing is performed is described here, there is no particular limitation on the order; embossing may be performed before cutting the sheet and then the sheet is cut so as to be in the state illustrated in FIG. 3B. Alternatively, the sheet may be cut after thermocompression bonding is performed with the sheet bent.

Embossing, which is a kind of pressing, will be described.

FIGS. 5A to 5F are cross-sectional views showing examples of embossing. Note that embossing refers to processing for forming projections and depressions on a film by bringing an embossing roll whose surface has projections and depressions into contact with the film with pressure. The embossing roll is a roll whose surface is patterned.

Figure 5A:
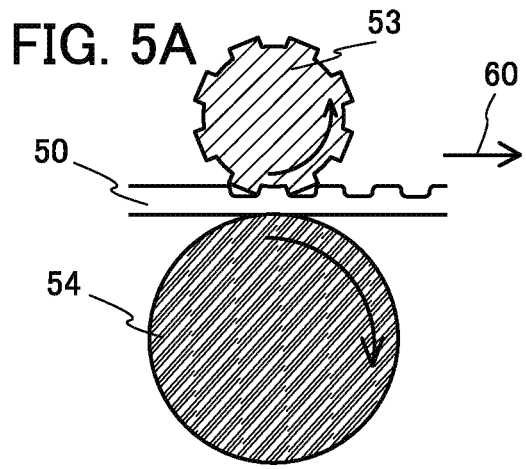
FIGS. 5A to 5F illustrate embossing of one embodiment of the present invention.

An example where one surface of a film is embossed is illustrated in FIG. 5A.

FIG. 5A illustrates the state where a film 50 is sandwiched between an embossing roll 53 in contact with the one surface of the film and a roll 54 in contact with the other surface and the film 50 is being transferred in a direction 60. The surface of the film is patterned by pressure or heat. The surface of the film may be patterned by pressure and heat.

Processing illustrated in FIG. 5A is called one-side embossing, which can be performed by a combination of the embossing roll 53 and the roll 54 (a metal roll or an elastic roll such as a rubber roll).

Figure 5B:
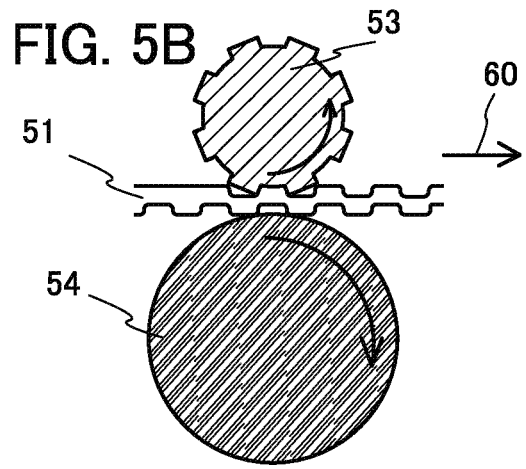

FIG. 5B illustrates the state where a film 51 whose one surface is embossed is sandwiched between the embossing roll 53 and the roll 54 and is transferred in the direction 60. The embossing roll 53 rolls along a non-embossed surface of the film 51; thus, both surfaces of the film 51 are embossed. As described here, one film can be embossed plural times.

Figure 5C:
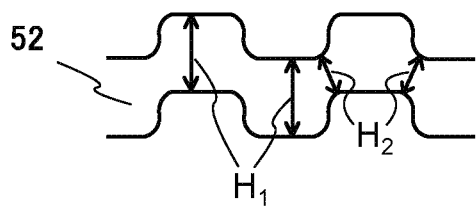

FIG. 5C is an enlarged view of a cross section of a film 52 whose both surfaces are embossed. Note that $H_1$ represents the thickness of the film in depressions or projections, and $H_2$ represents the thickness of the film at a boundary portion between a depression and its adjacent projection or the thickness of the film at a boundary portion between a projection and its adjacent depression. The thickness of the film is not uniform, and $H_2$ is smaller than $H_1$.

Figure 5D:
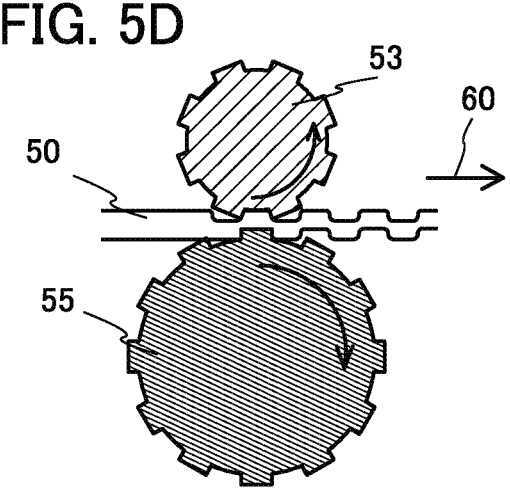

FIG. 5D illustrates another example where both surfaces of a film are embossed.

FIG. 5D illustrates the state where the film 50 is sandwiched between the embossing roll 53 in contact with one surface of the film and an embossing roll 55 in contact with the other surface and the film 50 is being transferred in the direction 60.

Processing illustrated in FIG. 5D is called both-side embossing, which can be performed by a combination of the embossing roll 53 and the embossing roll 55, in which a depression of one embossing roll and a projection of the other embossing roll are in a set. The surface of the film 50 is patterned with alternate projections and depressions; projections are formed by raising part of the surface of the film 50 and depressions are formed by concaving part of the surface of the film 50.

Figure 5E:
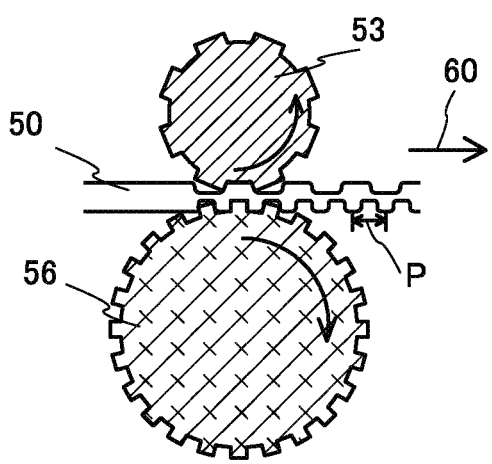

FIG. 5E illustrates the case of using the embossing roll 53 and an embossing roll 56 for making protrusions with a pitch different from that of protrusions made with the embossing roll 53 in FIG. 5D. Note that a protrusion pitch or an embossing pitch is the distance between the tops of adjacent protrusions. For example, a distance P in FIG. 5E is a protrusion pitch or an embossing pitch. FIG. 5E illustrates the state where the film 50 is sandwiched between the embossing roll 53 and the embossing roll 56 and is transferred in the direction 60. The film processed using the embossing rolls with different protrusion pitches can have surfaces with different embossing pitches.

Figure 5F:
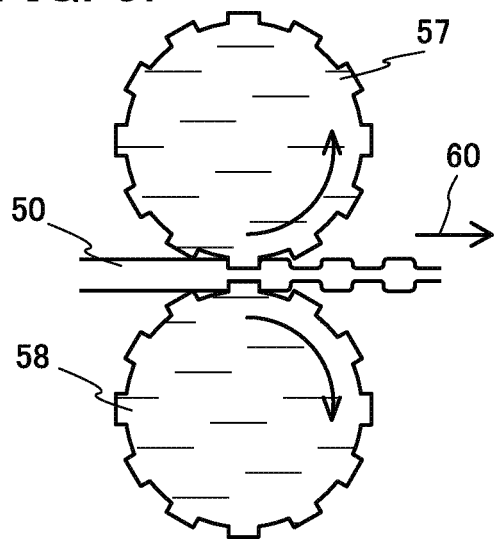

FIG. 5F illustrates the state where the film 50 is sandwiched between an embossing roll 57 in contact with one surface of the film and an embossing roll 58 in contact with the other surface and the film 50 is being transferred in the direction 60.

Processing illustrated in FIG. 5F is called tip-to-tip both-side embossing performed by a combination of the embossing roll 57 and the embossing roll 58 that has the same pattern as the embossing roll 57. The phases of the projections and depressions of the two embossing rolls are the same, so that substantially the same pattern can be formed on both surfaces of the film 50. Unlike in the case of FIG. 5F, embossing may be performed without matching the phases of the projections and depressions of the same embossing rolls.

An embossing plate can be used instead of the embossing roll. Furthermore, embossing is not necessarily employed, and any method that allows formation of a relief on part of the film can be employed.

In this embodiment, projections and depressions are provided on both surfaces of the film 10a of the film 10 so that the film 11 having patterns is formed, and the film 11 is folded at the center such that two end portions overlap with each other, and is sealed on three sides with an adhesive layer.

Figure 6A:
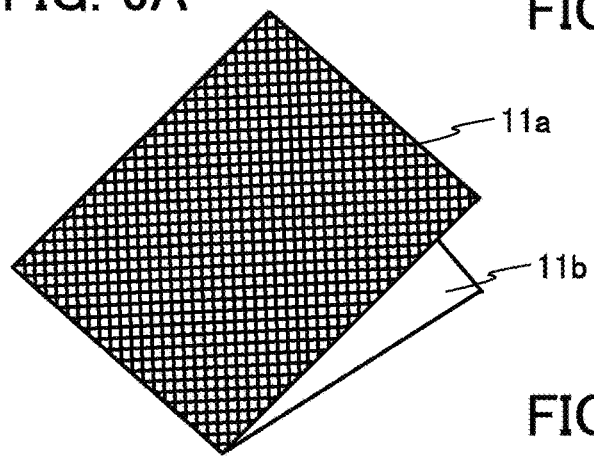
FIGS. 6A to 6F are top views, a cross-sectional view, and a schematic view illustrating one embodiment of the present invention.

Then, the film 11 is folded along a dotted line shown in FIG. 3B so as to be in the state illustrated in FIG. 6A.

Figure 6C:
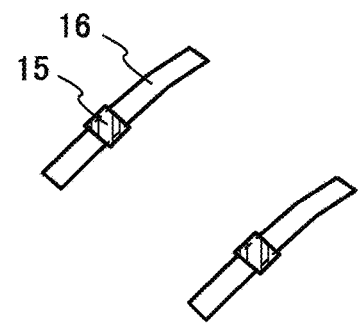
Figure 6B:
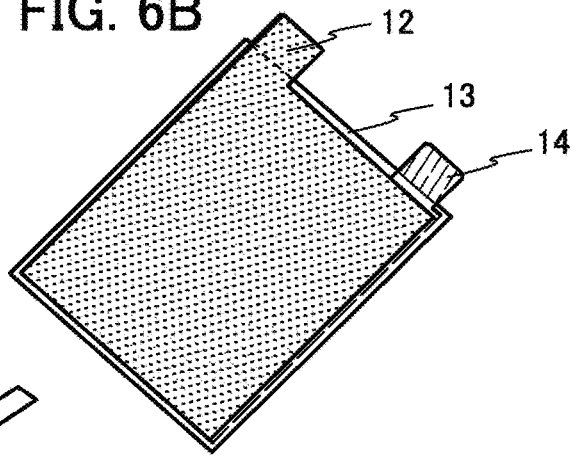

A positive electrode current collector 12 on the surface of which a positive electrode active material layer 18 is partly formed, a separator 13, and a negative electrode current collector 14 on the surface of which a negative electrode active material layer 19 is partly formed are stacked as illustrated in FIG. 6B to constitute a secondary battery. The positive electrode current collector 12 and the negative electrode current collector 14 can each be formed using a highly conductive material that is not alloyed with a carrier ion such as a lithium ion, for example, a metal such as stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 40 μm inclusive. Note that in the example illustrated here, for simplicity, one stack including the positive electrode current collector 12 provided with the positive electrode active material layer 18, the separator 13, and the negative electrode current collector 14 provided with the negative electrode active material layer 19 is packed in an exterior body. To increase the capacity of a secondary battery, a plurality of the stacks may be stacked and packed in an exterior body.

In addition, two lead electrodes 16 with sealing layers 15 illustrated in FIG. 6C are prepared. The lead electrodes 16 are each also referred to as a lead terminal and provided in order to lead a positive electrode or a negative electrode of a secondary battery to the outside of an exterior film Aluminum and nickel-plated copper are used for the positive electrode lead and the negative electrode lead, respectively.

Then, the positive electrode lead is electrically connected to a protruding portion of the positive electrode current collector 12 by ultrasonic welding or the like, and the negative electrode lead is electrically connected to a protruding portion of the negative electrode current collector 14 by ultrasonic welding or the like.

Then, two sides of the film 11 are sealed by thermocompression bonding, and one side is left open for introduction of an electrolyte solution (hereinafter the shape of a film in this state also referred to as a form of a bag). In thermocompression bonding, the sealing layers 15 provided on the lead electrodes are also melted, thereby fixing the lead electrodes and the film 11 to each other. After that, in reduced pressure or an inert gas atmosphere, a desired amount of electrolyte solution is introduced to the inside of the film 11 in the form of a bag. Lastly, the outer edge of the film 11 that has not been subjected to thermocompression bonding and is left open is sealed by thermocompression bonding.

Figure 6D:
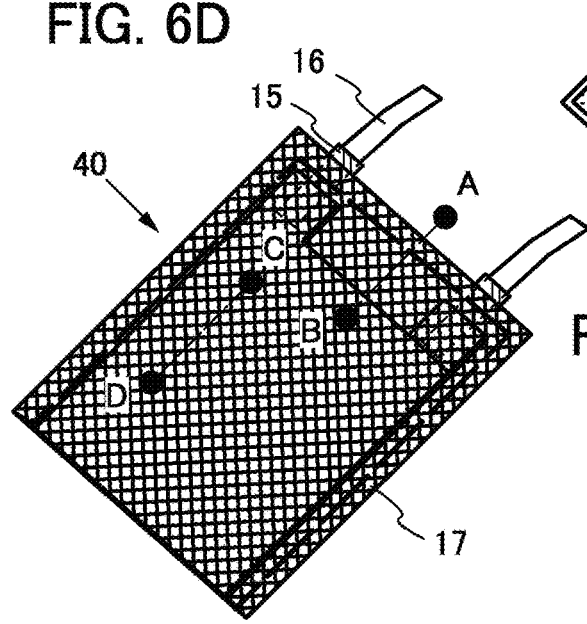

In this manner, a secondary battery 40 illustrated in FIG. 6D can be fabricated.

In the obtained secondary battery 40, the surface of the film 10 serving as an exterior body has a pattern of projections and depressions. A region between a dotted line and an edge in FIG. 6D is a thermocompression-bonded region 17. A surface of the thermocompression-bonded region 17 also has a pattern of projections and depressions. Although the heights of projections and the depths of depressions are smaller in the thermocompression-bonded region 17 than in the center portion, the projections and depressions can relieve stress applied when the secondary battery is bent.

Figure 6F:
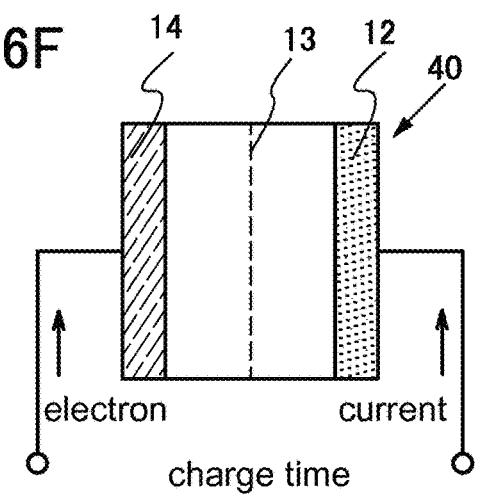
Figure 6E:
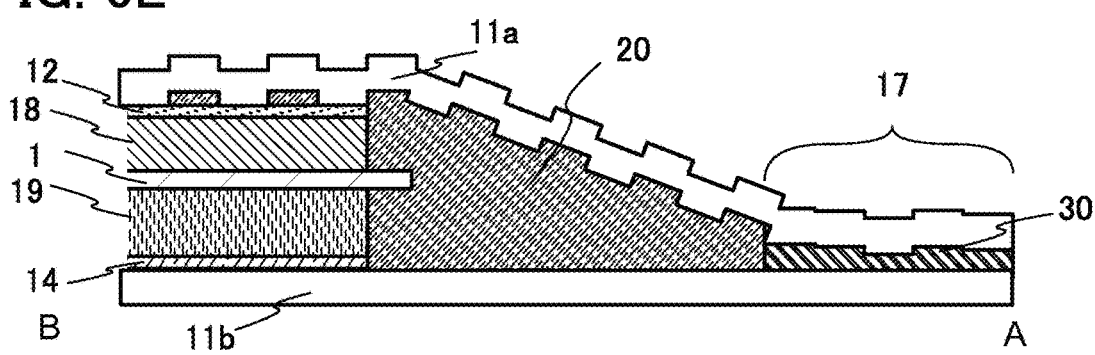

FIG. 6E illustrates an example of a cross section taken along dashed-dotted line A-B in FIG. 6D.

As illustrated in FIG. 6E, projections and depressions of the film 11a are different between a region overlapping with the positive electrode current collector 12 and the thermocompression-bonded region 17. As illustrated in FIG. 6E, the positive electrode current collector 12, the positive electrode active material layer 18, the separator 13, the negative electrode active material layer 19, and the negative electrode current collector 14 are stacked in this order and placed inside the folded film 11, an end portion is sealed with an adhesive layer 30, and the other space inside the folded film 11 is provided with an electrolyte solution 20.

Figure 7A:
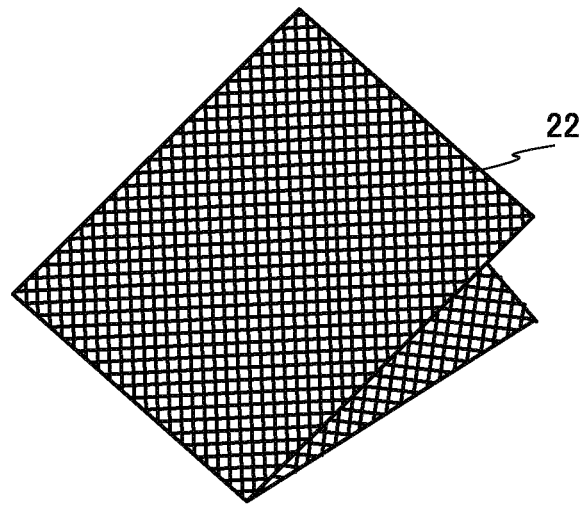
FIGS. 7A to 7C are top views and a cross-sectional view illustrating one embodiment of the present invention.
Figure 7B:
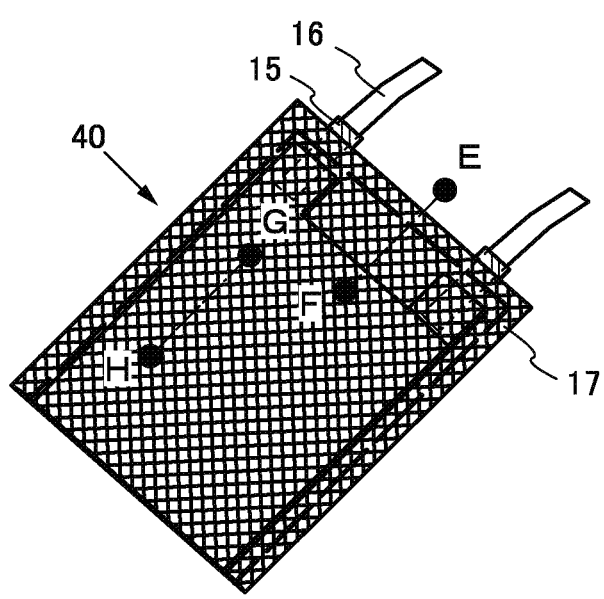

In a similar manner, the secondary battery 40 illustrated in FIG. 7B may be fabricated using the film 22, which is formed by entirely providing projections and depressions on both the surfaces of the film 10 to form a pattern. FIG. 7A illustrates the film 22 folded along a line indicated by a dotted line in FIG. 4A.

Figure 7C:
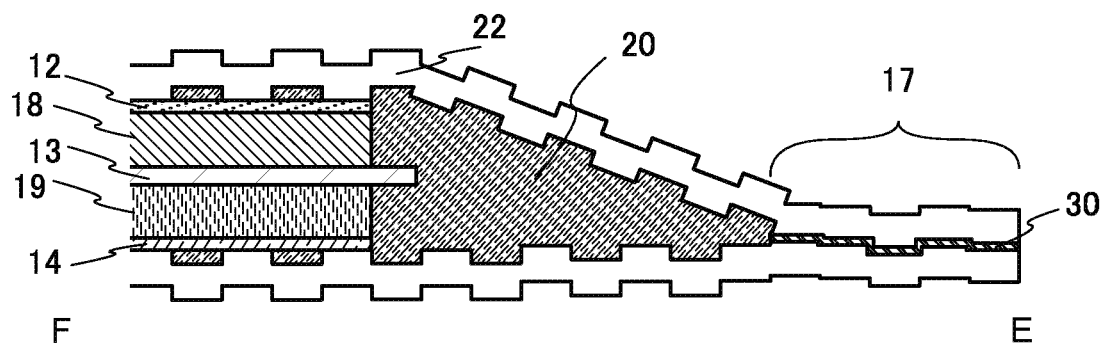

FIG. 7C illustrates an example of a cross section of the secondary battery 40 formed using the film 22 taken along dashed-dotted line E-F in FIG. 7B.

As illustrated in FIG. 7C, projections and depressions of the film 22 are different between a region overlapping with the positive electrode current collector 12 and the thermocompression-bonded region 17. As illustrated in FIG. 7C, the positive electrode current collector 12, the positive electrode active material layer 18, the separator 13, the negative electrode active material layer 19, and the negative electrode current collector 14 are stacked in this order and placed inside the folded film 22, an end portion is sealed with an adhesive layer 30, and the other space inside the folded film 22 is provided with an electrolyte solution 20.

Examples of positive electrode active materials that can be used for the positive electrode active material layer 18 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si, and x≥2) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material.

As the separator 13, an insulator such as cellulose (paper), polyethylene with pores, and polypropylene with pores can be used.

As an electrolyte in the electrolyte solution, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolyte solution, a material with the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolyte solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as a solvent of the electrolyte solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolyte solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 19; for example, a lithium metal, a carbon-based material, an alloy-based material, or the like can be used.

The lithium metal is preferable because of its low redox potential (−3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, fullerene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li') when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$, (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$, which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active materials, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{(3-x)}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

In the secondary battery, for example, the separator 13 has a thickness of approximately 15 μm to 30 μm, the positive electrode current collector 12 has a thickness of approximately 10 μm to 40 μm, the positive electrode active material layer 18 has a thickness of approximately 50 μm to 100 μm, the negative electrode active material layer 19 has a thickness of approximately 50 μm to 100 μm, and the negative electrode current collector 14 has a thickness of approximately 5 μm to 40 μm. The film 11 has a thickness of approximately 0.113 mm. The film 11 is embossed to a depth of approximately 500 μm. If the film 11 is embossed to a depth of 2 mm or more, the whole secondary battery is too thick.

The battery capacity per unit volume is preferably as large as possible. The battery capacity per unit volume becomes large as the proportion of the volume of a battery portion to the total volume of the secondary battery increases. When the embossing depth is increased, the total thickness of the secondary battery is increased and the proportion of the volume of the battery portion to the total volume is decreased, resulting in a small battery capacity.

Figure 8A:
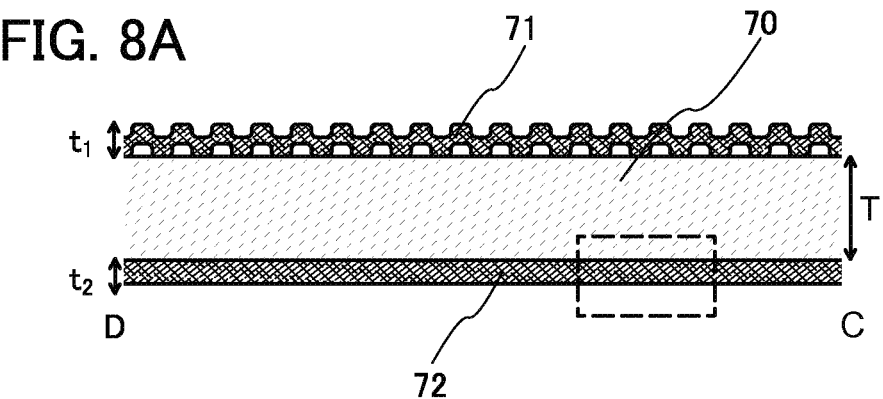
FIGS. 8A to 8D are each a cross-sectional view of a secondary battery of one embodiment of the present invention.
Figure 9A:
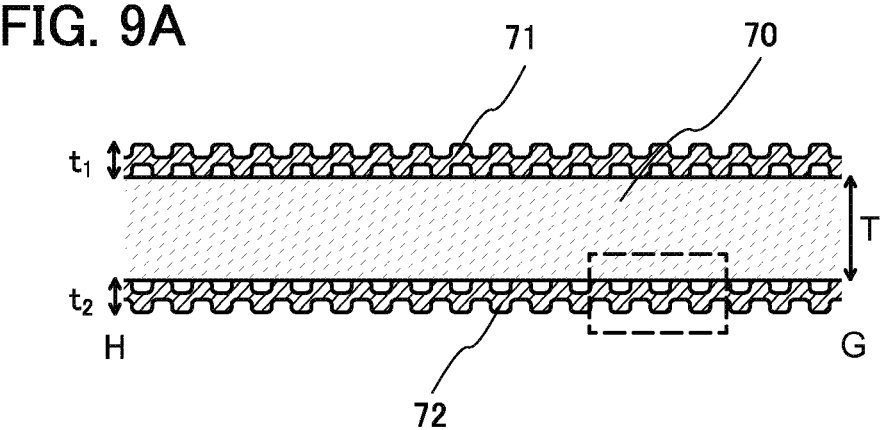
FIGS. 9A to 9C are each a cross-sectional view of a secondary battery of one embodiment of the present invention.

The proportion of the volume of the battery portion to the total volume of the secondary battery is preferably greater than or equal to 50%. FIG. 8A is an example of a cross-sectional view of the secondary battery in FIG. 6D taken along line C-D. FIG. 9A is an example of a cross-sectional view of the secondary battery in FIG. 7B taken along line G-H. FIG. 8A and FIG. 9A each illustrate components 70 in the battery, an embossed film 71 that covers the top surface of the battery, and a non-embossed film 72 or an embossed film 72 that covers the bottom surface of the battery. For simplification of the drawings, the electrolyte solution and a stack including the positive electrode current collector on the surface of which the positive electrode active material layer is formed, the separator, the negative electrode current collector on the surface of which the negative electrode active material layer is formed, and the like are collectively illustrated as the components 70 in the battery. Note that T represents the thickness of the components 70 in the battery, $t_1$ represents the summation of the embossing depth and the thickness of the embossed film 71 that covers the top surface of the battery, and $t_2$ represents the thickness of the non-embossed film 72 that convers the bottom surface of the battery or the summation of the embossing depth and the thickness of the embossed film 72 that convers the bottom surface of the battery. The total thickness of the secondary battery can be expressed by $T+t_1+t_2$. This means that $T>t_1+t_2$ needs to be satisfied to make the proportion of the volume of the components 70 in the battery to the total volume of the secondary battery greater than or equal to 50%.

The adhesive layer 30, which is only partly illustrated in FIG. 6E and FIG. 7C, is formed in the following manner: a layer made of polypropylene is provided on the entire surface of the film on the side where the attachment is performed, and only a thermocompression-bonded portion becomes the adhesive layer 30.

FIG. 6E and FIG. 7C each illustrate an example where the film 11b or the bottom side of the film 22 is fixed and pressure bonding is performed. In this case, the top side is greatly bent and a step is formed. Thus, when a plurality of combinations of the above stacked layers (e.g., eight or more combinations) is provided inside the folded film 11 or 22, the step is large and the film 11a or the top side of the film 22 might be too stressed. Furthermore, an edge portion of the top side of the film might be misaligned with an edge portion of the bottom side of the film. To prevent misalignment of the edge portions, a step may also be provided for the bottom side of the film and pressure bonding may be performed at a center portion so that stress is uniformly applied.

In the case where the misalignment is large, there is a region where part of an end portion of one film does not overlap with the other film. To correct the misalignment of the end portions of the upper film and the lower film, such a region may be cut off.

Here, a current flow in charging a secondary battery will be described with reference to FIG. 6F. When a secondary battery using lithium as a carrier ion is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Two terminals in FIG. 6F are connected to a charger, and a secondary battery 40 is charged. As the charge of the secondary battery 40 proceeds, a potential difference between electrodes increases. In FIG. 6F, electrons flow from one terminal outside the secondary battery 40 to the positive electrode current collector 12; thus, current flows from the positive electrode a current collector 12 to the negative electrode current collector 14 in the secondary battery 40. The positive direction in FIG. 6F is the direction of the current that flows from the negative electrode to the other terminal outside the secondary battery 40. In other words, a current flows in the direction of a flow of a charging current.

In an example in this embodiment, one rectangle film is folded in half and two end portions are made to overlap with each other for sealing. However, the shape of the film is not limited to a rectangle and can be a polygon such as a triangle, a square, or a pentagon or any symmetric shape other than a rectangle, such as a circle or a star.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is also possible.

Embodiment 2

Figure 3C:
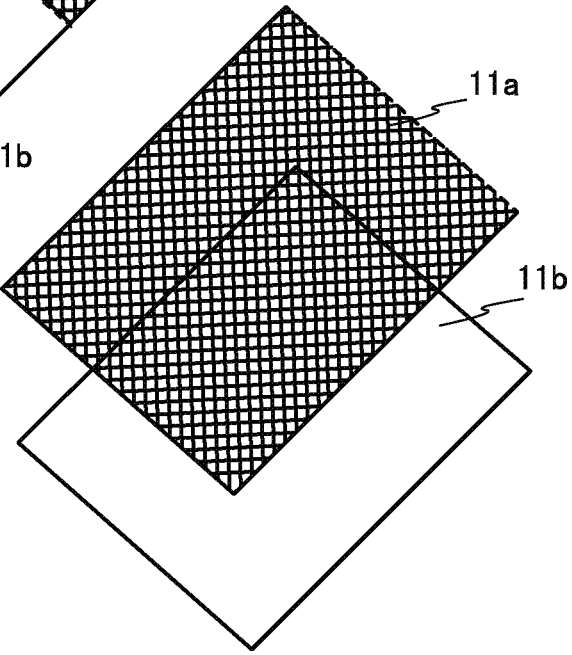
Figure 4B:
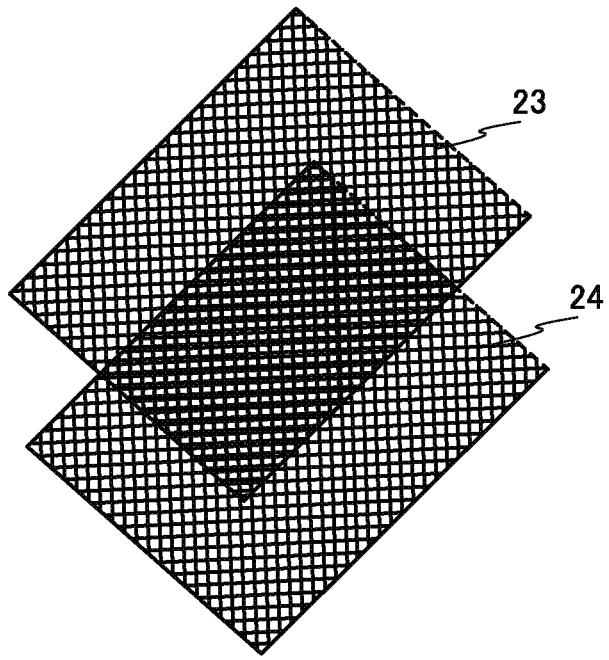

In this embodiment, an example where two films 11a and 11b are formed as illustrated in FIG. 3C and attached to each other to fabricate a secondary battery will be described with reference to FIGS. 6A to 6F and FIGS. 8A to 8D. In addition, an example where two films 23 and 24 are formed as illustrated in FIG. 4B and attached to each other to fabricate a secondary battery will be described with reference to FIGS. 7A to 7C and FIGS. 9A to 9C.

A bendable secondary battery is not used by itself but is mounted on an electronic device or the like to be used. For this reason, once the shape of a secondary battery to be mounted on an electronic device is fixed, the shape of the secondary battery does not need to be changed in many cases.

For example, when a secondary battery bent in one direction at a certain angle is mounted on an electronic device, the shape of the secondary battery is fixed in that state in many cases. In that case, the secondary battery does not need to be bent back into shape or bent backward.

Thus, for a bendable secondary battery, the only stress that needs to be considered is that applied when the secondary battery is bent in only one direction.

Figure 8B:
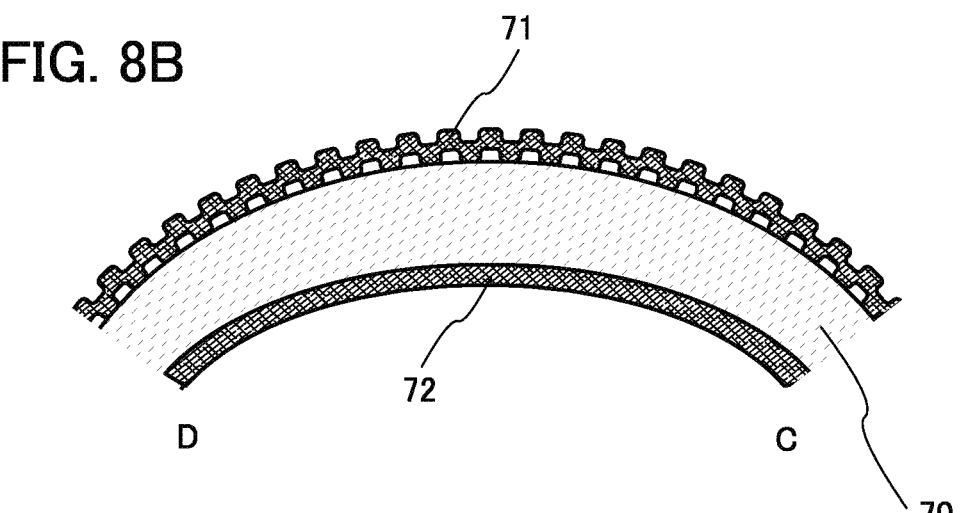

FIG. 8B is an example of a cross-sectional view of the secondary battery in FIG. 6D taken along line C-D, where the secondary battery is fabricated using the film in FIG. 6A and is bent in one direction. Note that for simplification of the drawings, the electrolyte solution and a stack including the positive electrode current collector on the surface of which the positive electrode active material layer is formed, the separator, the negative electrode current collector on the surface of which the negative electrode active material layer is formed, and the like are collectively illustrated as the components 70 in the battery.

When the secondary battery is bent as illustrated in FIG. 8B, compressive stress is applied to the film 72 that covers the bottom surface of the secondary battery whereas tensile stress is applied to the film 71 that covers the top surface of the secondary battery. By forming a pattern of depressions or projections on surfaces of the film 71 as illustrated in FIG. 8B, influence of distortion can be reduced to be acceptable even when the tensile stress is applied to the film 71. For this reason, the secondary battery can change its form such that the exterior body on the side closer to the center of curvature has a curvature radius greater than or equal to 10 mm, preferably greater than or equal to 30 mm.

Figure 9B:
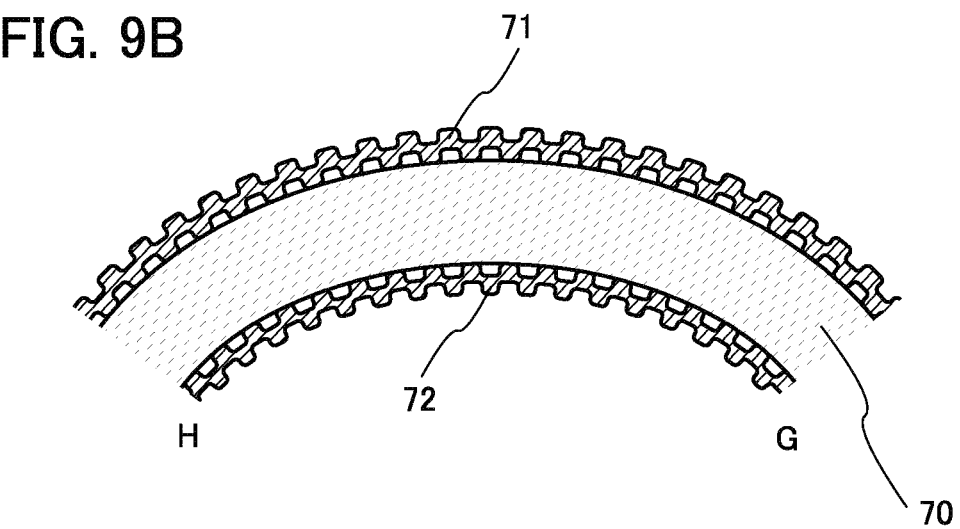

FIG. 9B is an example of a cross-sectional view of the secondary battery in FIG. 7B taken along line G-H, where the secondary battery is fabricated using the film in FIG. 7A and is bent in one direction. Note that for simplification of the drawings, the electrolyte solution and a stack including the positive electrode current collector on the surface of which the positive electrode active material layer is formed, the separator, the negative electrode current collector on the surface of which the negative electrode active material layer is formed, and the like are collectively illustrated as the components 70 in the battery.

Figure 10A:
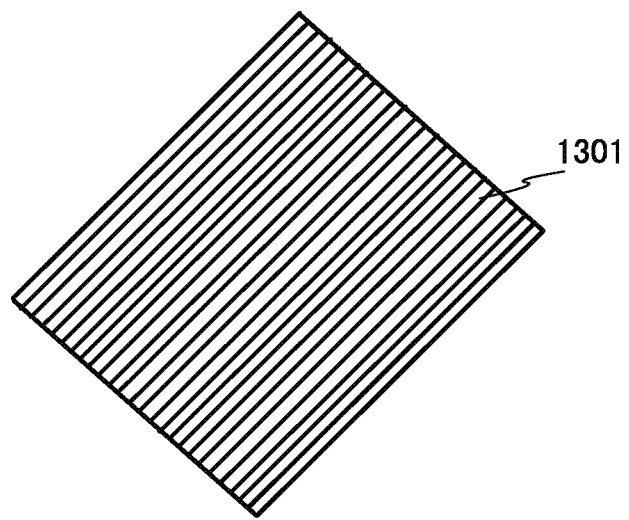
FIGS. 10A and 10B are top views each illustrating one embodiment of the present invention.
Figure 10B:
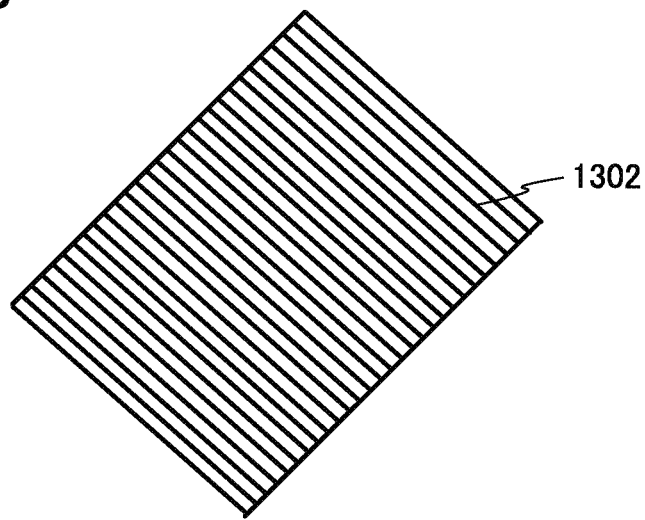

In FIG. 8B, only the film 71 that covers the top surface of the secondary battery has a pattern of depressions or projections on its surfaces; however, one embodiment of the present invention is not limited thereto, and embossing may be performed not only on the film 71 but also on the film 72 that covers the bottom surface of the secondary battery to which compressive stress is applied, as illustrated in FIG. 9B. When both of the films 71 and 72 have a pattern of depressions or projections, influence of distortion can be further reduced. The film 72 that covers the bottom surface of the secondary battery to which compressive stress is applied may have a geometric pattern in which lines slanted in two directions cross each other, a vertical stripe pattern 1301 illustrated in FIG. 10A, or a horizontal stripe pattern 1302 illustrated in FIG. 10B.

Figure 8C:
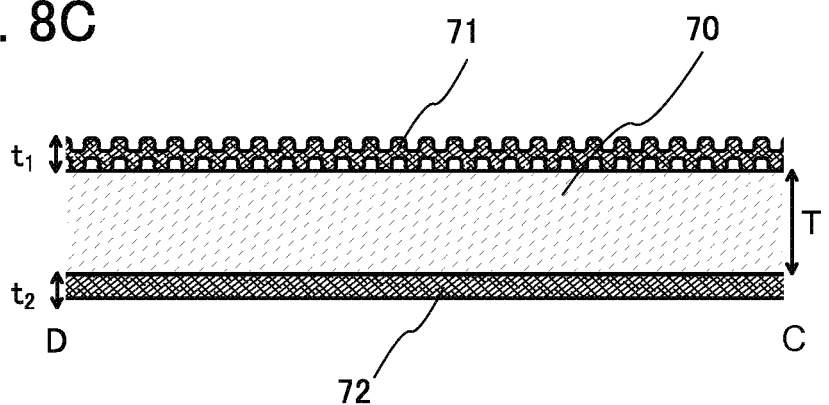

Since tensile stress is applied to the film 71 that covers the top surface of the secondary battery, it is desirable to perform embossing such that the film easily extends. Embossing with a narrow pitch increases the surface area of a film, so that the film easily extends when being bent. Thus, to bend a film at a small radius of curvature, a narrow embossing pitch is preferably employed as illustrated in FIG. 8C and FIG. 9C rather than that illustrated in FIG. 8A or FIG. 9A.

Figure 9C:
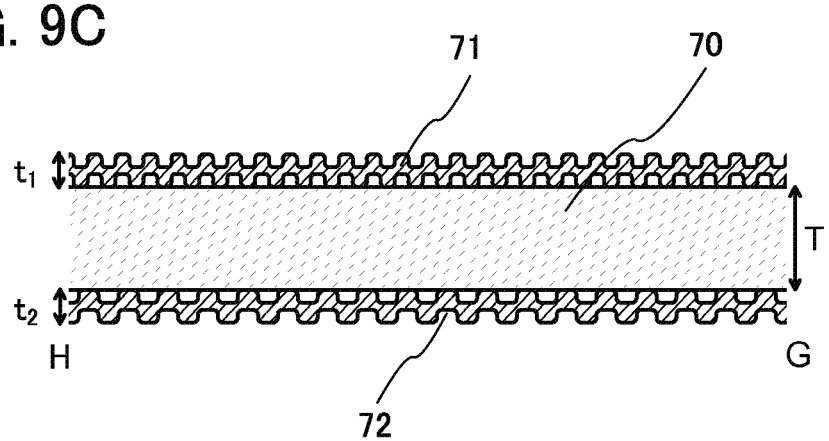

In FIGS. 9A to 9C, two films with an optimized embossing depth and an optimized embossing pitch are used for sealing of the secondary battery. However, one film which is subjected to both embossing optimized for relieving tensile stress and embossing optimized for relieving compressive stress may be used, in which case embossing optimized for relieving tensile stress is performed on half of the film and embossing optimized for relieving compressive stress is performed on the other half. After that, the film is folded along a boundary between the region subjected to embossing optimized for relieving tensile stress and the region subjected to embossing optimized for relieving compressive stress such that end portions of the film are aligned, and sealing is performed.

Figure 8D:
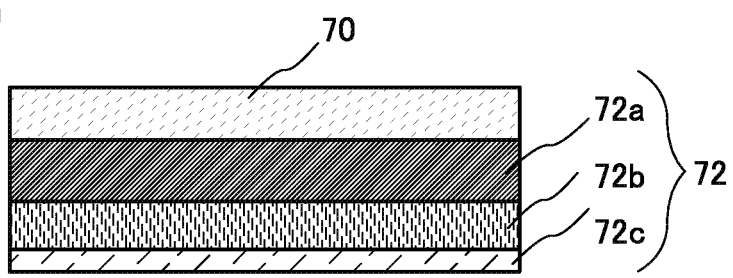

FIG. 8D is an enlarged view of the film 72 in a region surrounded by a dotted line in each of FIG. 8A and FIG. 9A. A stacked-layer film as illustrated in FIG. 8D can be used as the film that covers the bottom surface of the secondary battery. For example, a film 72a made of polypropylene, a film 72b made of aluminum, and a film 72c made of nylon can be used.

The film 11a with optimized embossing depth and optimized embossing pitch and the non-embossed film 11b, or the films 23 and 24 with optimized embossing depth and optimized embossing pitch are prepared, and then a stack including the positive electrode current collector 12, the separator 13, and the negative electrode current collector 14 illustrated in FIG. 6B is provided between the two films as in Embodiment 1. The positive electrode active material layer 18 is formed on part of a surface of the positive electrode current collector 12, and the negative electrode active material layer 19 is formed on part of a surface of the negative electrode current collector 14. After that, the lead electrode 16 is electrically connected to each of the protruding portions of the positive electrode current collector 12 and the negative electrode current collector 14 by ultrasonic welding or the like. Then, three sides of the films are sealed by thermocompression bonding to form a bag with one side left open for introduction of an electrolyte solution. In a reduced-pressure atmosphere or an inert atmosphere, a desired amount of electrolyte solution is introduced in the bag. The side of the film which has not been subjected to thermocompression bonding is sealed by thermocompression bonding, whereby a secondary battery is completed.

Although the case where a secondary battery mounted on an electronic device or the like is bent in one direction and its shape is fixed is described in this embodiment, the secondary battery bent in one direction may be almost straightened and bent repeatedly.

Embodiment 3

In this embodiment, examples where a plurality of stacks that are partly different from those in Embodiment 1 are packed in the folded film 11 will be described with reference to FIGS. 11A to 11E, FIGS. 12A to 12C, and FIGS. 13A to 13C.

The stacks in this embodiment may be provided between the embossed film 11a and the non-embossed film 11b or between the embossed films 23 and 24 described in Embodiment 2.

Figure 11A:
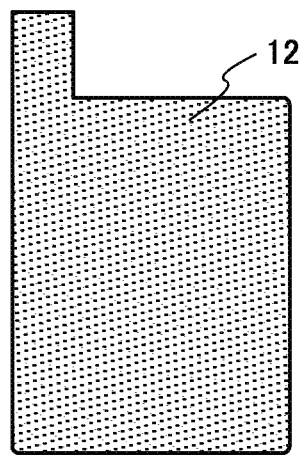
FIGS. 11A to 11E are top views each illustrating one embodiment of the present invention.
Figure 11B:
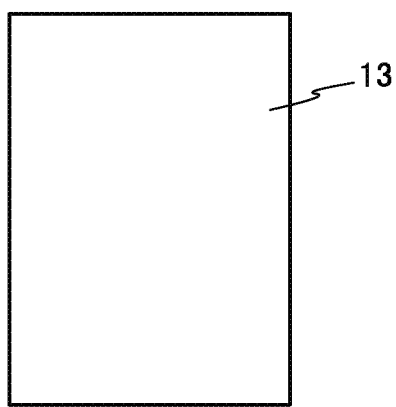
Figure 11C:
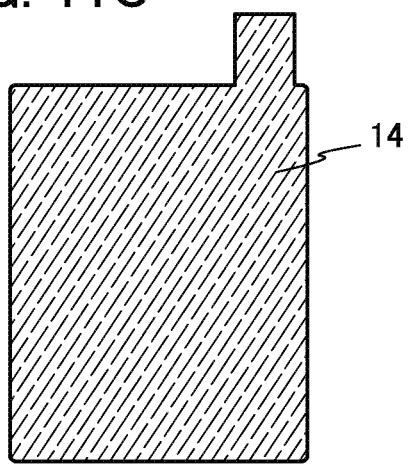
Figure 11D:
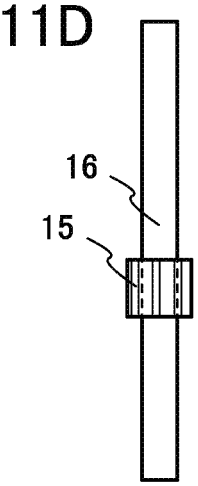
Figure 11E:
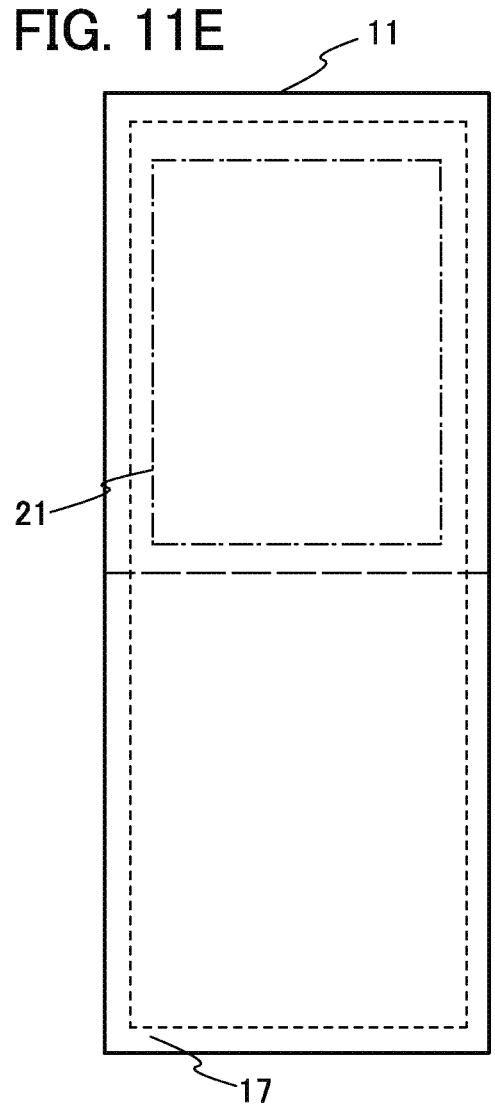

FIG. 11A is a top view of the positive electrode current collector 12. FIG. 11B is a top view of the separator 13. FIG. 11C is a top view of the negative electrode current collector 14. FIG. 11D is a top view of the sealing layer 15 and the lead electrode 16. FIG. 11E is a top view of the film 11.

The dimensions of the positive electrode current collector, the negative electrode current collector, and the separator are substantially the same in FIGS. 11A to 11E. A region 21 surrounded by a chain line in FIG. 11E has substantially the same dimensions as the separator in FIG. 11B. A region between a dotted line in FIG. 11E and an end portion is the thermocompression-bonded region 17.

Figure 12A:
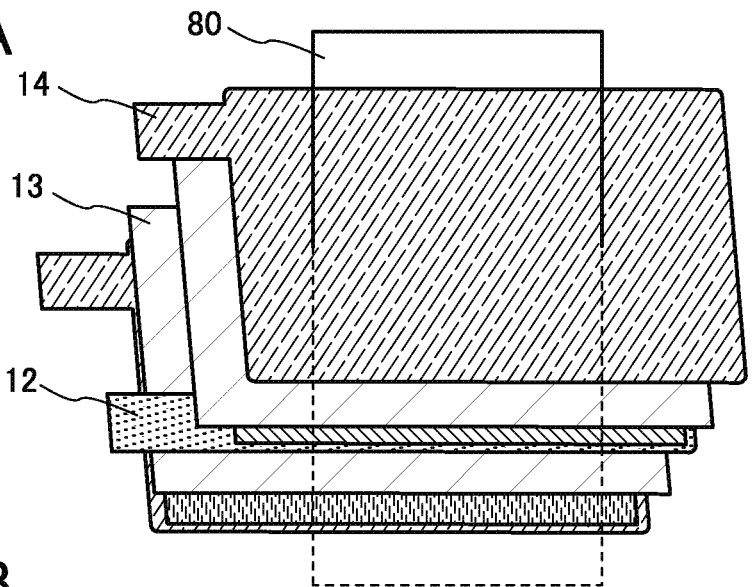
FIGS. 12A to 12C are perspective views and a cross-sectional view each illustrating one embodiment of the present invention.
Figure 12B:
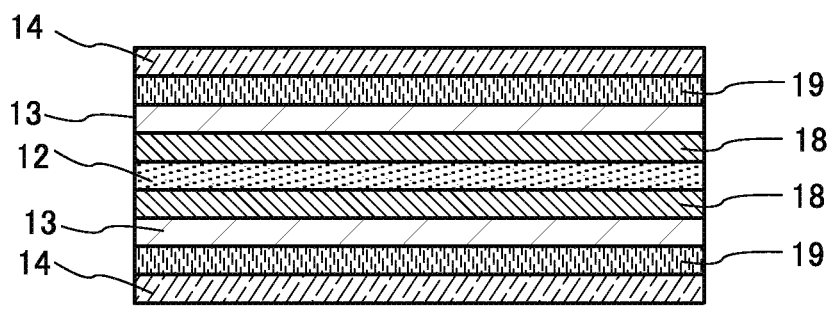
Figure 12C:
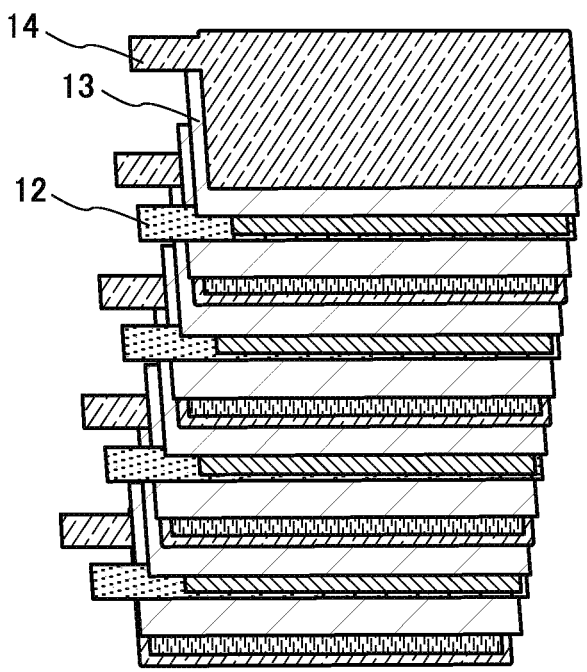

FIG. 12A illustrates an example where a positive electrode active material layer 18 is provided on both surfaces of the positive electrode current collector 12. Specifically, the negative electrode current collector 14, the negative electrode active material layer 19, the separator 13, the positive electrode active material layer 18, the positive electrode current collector 12, the positive electrode active material layer 18, the separator 13, the negative electrode active material layer 19, and the negative electrode current collector 14 are stacked in this order. FIG. 12B is a cross-sectional view of the stacked-layer structure taken along a plane 80.

Note that although FIG. 12A illustrates an example where two separators are used, the following structure may be employed: one separator is folded and two edges are sealed to form a bag, and the positive electrode current collector 12 is provided in the bag. The positive electrode active material layer 18 is formed on both surfaces of the positive electrode current collector 12 provided in the bag-like separator.

The negative electrode active material layer 19 may be provided on both surfaces of the negative electrode current collector 14. In the secondary battery illustrated in FIG. 12C, three negative electrode current collectors 14 whose both surfaces are provided with the negative electrode active material layer 19, four positive electrode current collectors 12 whose both surfaces are provided with the positive electrode active material layer 18, and eight separators 13 are sandwiched between two negative electrode current collectors 14 in each of which one surface is provided with the negative electrode active material layer 19. In this case, four bag-like separators can be used instead of eight separators.

The capacity of the secondary battery can be increased by increasing the number of the stacks. In addition, when the positive electrode active material layer 18 is provided on both surfaces of the positive electrode current collector 12 and the negative electrode active material layer 19 is provided on both surfaces of the negative electrode current collector 14, the thickness of the secondary battery can be made small.

Figure 13A:
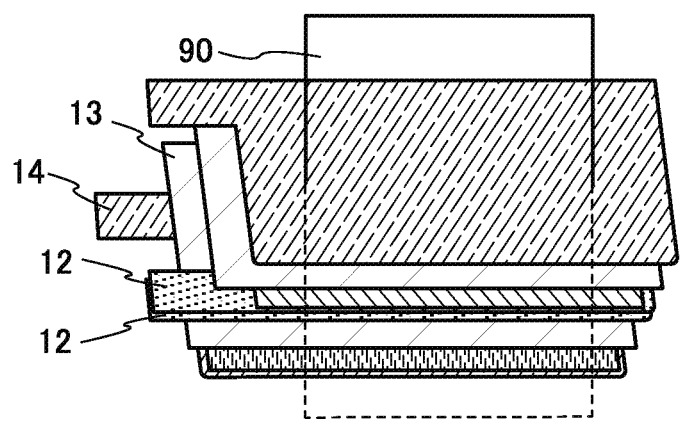
FIGS. 13A to 13C are perspective views and a cross-sectional view each illustrating one embodiment of the present invention.
Figure 13B:
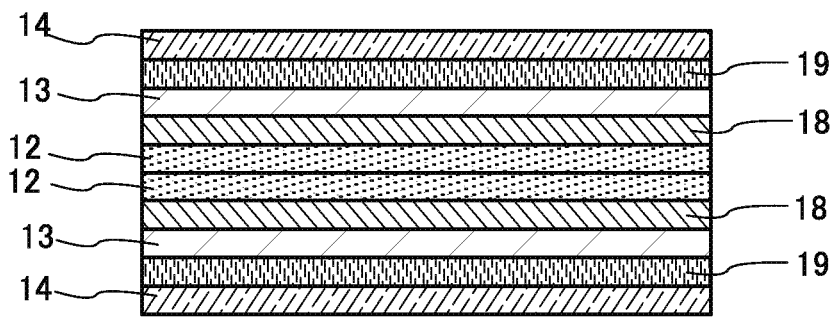

FIG. 13A illustrates a secondary battery in which the positive electrode active material layer 18 is provided on one surface of the positive electrode current collector 12 and the negative electrode active material layer 19 is provided on one surface of the negative electrode current collector 14. Specifically, the negative electrode active material layer 19 is provided on one surface of the negative electrode current collector 14 and the separator 13 is stacked on and in contact with the negative electrode active material layer 19. On a surface of the separator 13 remote from the negative electrode active material layer 19, the positive electrode active material layer 18 that is provided on one surface of the positive electrode current collector 12 is provided. On the other surface of the positive electrode current collector 12, another positive electrode current collector 12 whose one surface is provided with the positive electrode active material layer 18 is provided. Note that the positive electrode current collectors 12 are provided such that the surfaces remote from the positive electrode active material layers 18 face each other. Another separator 13 is stacked thereon, and the negative electrode active material layer 19 provided on one surface of the negative electrode current collector 14 is stacked on and in contact with the separator. FIG. 13B is a cross-sectional view of the stacked-layer structure in FIG. 13A, taken along a plane 90.

Although two separators are used in FIG. 13A, the following structure may be employed: one separator is folded and two edges are sealed to form a bag, and two positive electrode current collectors 12 in each of which one surface is provided with the positive electrode active material layer 18 are provided in the bag.

Figure 13C:
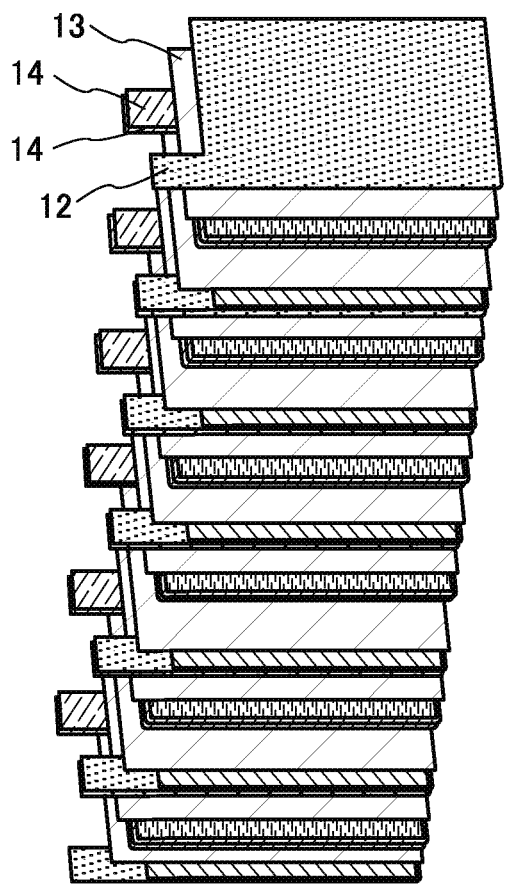

In FIG. 13C, a plurality of the stacks illustrated in FIG. 13A are stacked. In FIG. 13C, the negative electrode current collectors 14 are provided such that the surfaces remote from the negative electrode active material layers 19 face each other, and the positive electrode current collectors 12 are provided such that the surfaces remote from the positive electrode active material layers 18 face each other. In FIG. 13C, twelve positive electrode current collectors 12, twelve negative electrode current collectors 14, and twelve separators 13 are stacked.

A secondary battery with a structure in which the positive electrode active material layer 18 is provided on one surface of the positive electrode current collector 12 and the negative electrode active material layer 19 is provided on one surface of the negative electrode current collector 14 is thicker than a secondary battery with a structure in which the positive electrode active material layer 18 is provided on both surfaces of the positive electrode current collector 12 and the negative electrode active material layer 19 is provided on both surfaces of the negative electrode current collector 14, because the number of the current collectors is larger. However, the surface of the positive electrode current collector 12 on which the positive electrode active material layer 18 is not provided faces the surface of another positive electrode current collector 12 on which the positive electrode active material layer 18 is not provided; as a result, metal surfaces are in contact with each other. Similarly, the surface of the negative electrode current collector 14 on which the negative electrode active material layer 19 is not provided faces the surface of another negative electrode current collector 14 on which the negative electrode active material layer 19 is not provided; as a result, metal surfaces are in contact with each other. The metal surfaces easily slide on each other owing to the low friction. Since the metal surfaces in the secondary battery slide on each other at the time of bending, the secondary battery is easily bent.

The protruding portions of the positive electrode current collector 12 and the negative electrode current collector 14 are also referred to as tab portions. The tab portions of the positive electrode current collector 12 and the negative electrode current collector 14 are easily cut when the secondary battery is bent. This is because the tab portions are long and narrow protrusions and the stress is likely to be applied to the roots of the tab portions.

In the structure in which the positive electrode active material layer 18 is provided on one surface of the positive electrode current collector 12 and the negative electrode active material layer 19 is provided on one surface of the negative electrode current collector 14, there are a surface where the positive electrode current collectors 12 are in contact with each other and a surface where the negative electrode current collectors 14 are in contact with each other. The surface where the current collectors are in contact with each other has low friction resistance and thus easily relieves the stress due to the difference in radius of curvature that occurs when the battery is changed in shape. Furthermore, the total thickness of the tab portion is large in the structure in which the positive electrode active material layer 18 is provided on one surface of the positive electrode current collector 12 and the negative electrode active material layer 19 is provided on one surface of the negative electrode current collector 14; thus, the stress is distributed as compared with the case of the structure in which the positive electrode active material layer 18 is provided on both surfaces of the positive electrode current collector 12 and the negative electrode active material layer 19 is provided on both surfaces of the negative electrode current collector 14, and the tab portion is less likely to be cut.

In the case of thus stacking layers, the positive electrode current collectors 12 are all fixed and electrically connected at a time by ultrasonic welding. Furthermore, when ultrasonic welding is performed with the positive electrode current collectors 12 overlapping with a lead electrode, they can be electrically connected efficiently.

Ultrasonic welding can be performed in such a manner that ultrasonic waves are applied to the tab portion of the positive electrode current collector placed so as to overlap with a tab portion of another positive electrode current collector, while pressure is applied thereto.

Embodiment 4

In this embodiment, examples of electronic devices incorporating the lithium-ion secondary battery described in Embodiment 1 or 2 will be described with reference to FIGS. 14A to 14H, FIGS. 15A to 15C, and FIGS. 16A and 16B. In addition, Embodiment 3 can be used in combination.

The secondary battery fabricated according to any of Embodiments 1 to 3 includes, as an exterior body, a thin film having flexibility and thus can be bonded to a support structure body with a curved surface and can change its form reflecting the curved surface of a region of the support structure body that has a large radius of curvature.

Examples of electronic devices each using a flexible power storage device are as follows: display devices (also referred to as televisions or television receivers) such as head-mounted displays and goggle type displays, desktop personal computers, notebook personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of an automobile.

Figure 14A:
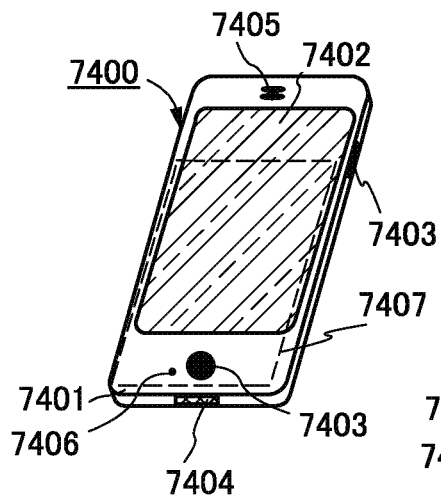

FIG. 14A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 14B:
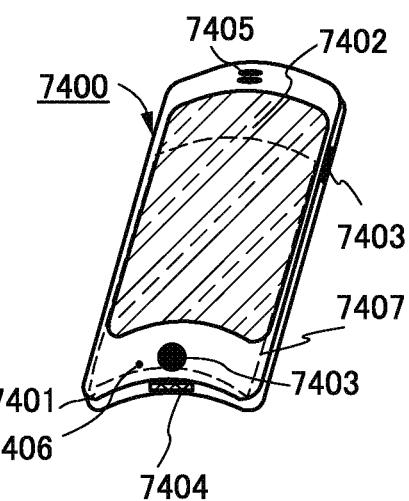
Figure 14C:
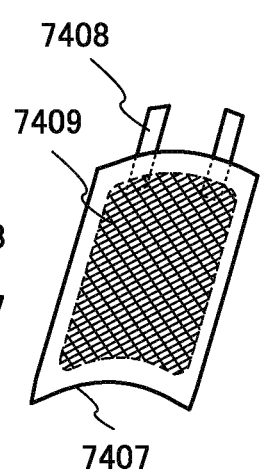

FIG. 14B illustrates the mobile phone 7400 that is bent. When the whole mobile phone 7400 is bent by external force, the power storage device 7407 included in the mobile phone 7400 is also bent. FIG. 14C illustrates the bent power storage device 7407. The power storage device 7407 is a laminated storage battery (also referred to as a layered battery or a film-covered battery). The power storage device 7407 is fixed while being bent. Note that the power storage device 7407 includes a lead electrode 7408 electrically connected to a current collector 7409. For example, a film serving as an exterior body of the power storage device 7407 is embossed, so that the power storage device 7407 has high reliability even when bent. The mobile phone 7400 may further be provided with a slot for insertion of a SIM card, a connector portion for connecting a USB device such as a USB memory.

Figure 14D:
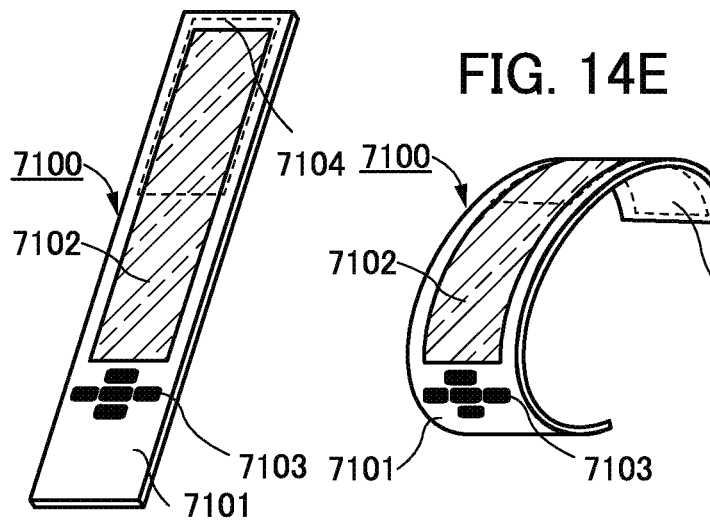
Figure 14E:
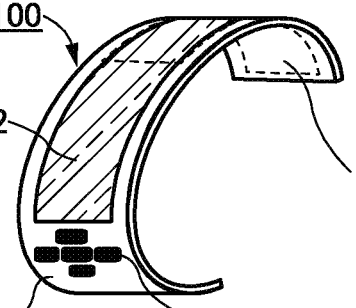
Figure 14F:
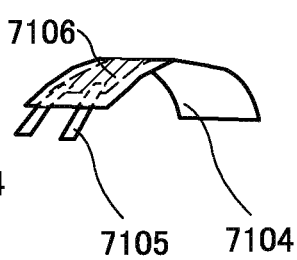
Figure 14G:
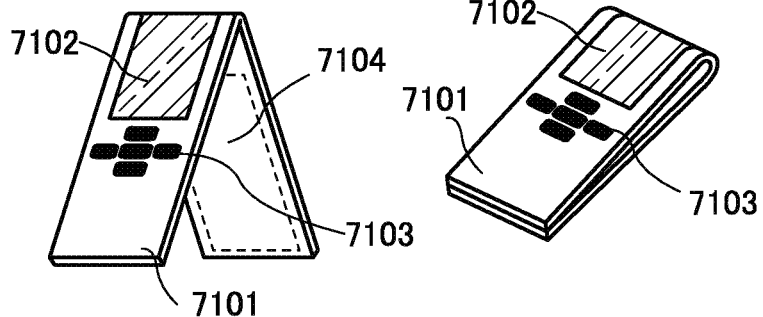
Figure 14H:
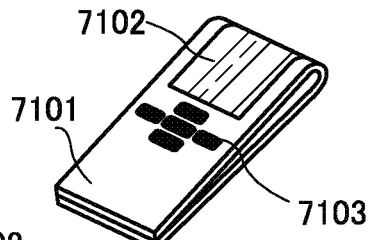

FIG. 14D illustrates an example of a mobile phone that can be bent. When bent to be put around a forearm, the mobile phone can be used as a bangle-type mobile phone as in FIG. 14E. A mobile phone 7100 includes a housing 7101, a display portion 7102, an operation button 7103, and a power storage device 7104. FIG. 14F illustrates the power storage device 7104 that can be bent. When the mobile phone is worn on a user's arm while the power storage device 7104 is bent, the housing changes its form and the curvature of a part or the whole of the power storage device 7104 is changed. Specifically, a part or the whole of the housing or the main surface of the power storage device 7104 is changed in the range of radius of curvature from 10 mm to 150 mm. Note that the power storage device 7104 includes a lead electrode 7105 that is electrically connected to a current collector 7106. For example, pressing is performed to form a plurality of projections and depressions on a surface of the film serving as the exterior body of the power storage device 7104, and retains high reliability even when the power storage device 7104 is bent many times with different curvatures. The mobile phone 7100 may further be provided with a slot for insertion of a SIM card, a connector portion for connecting a USB device such as a USB memory. When a center portion of the mobile phone illustrated in FIG. 14D is folded, a form illustrated in FIG. 14G can be obtained. When a center portion of the mobile phone is further folded so that end portions of the mobile phone overlap with each other as illustrated in FIG. 1411, the mobile phone can be reduced in size so as to be put in, for example, a pocket of clothes a user wears. As described above, the mobile phone illustrated in FIG. 14D can be changed in form in more than one way, and it is desirable that at least the housing 7101, the display portion 7102, and the power storage device 7104 have flexibility in order to change the form of the mobile phone.

Figure 15A:
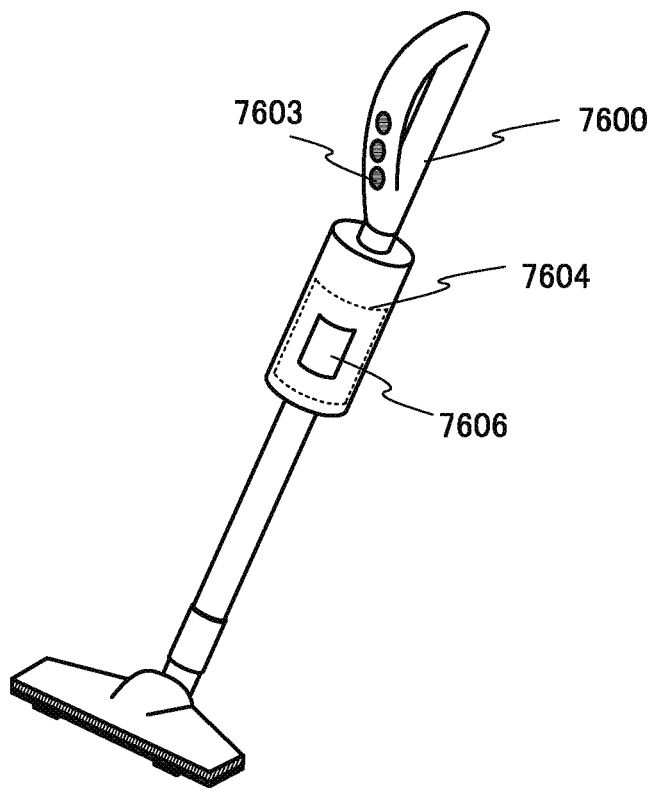
FIGS. 15A to 15C illustrate an electronic device.

FIG. 15A illustrates an example of a vacuum cleaner. By being provided with a secondary battery, the vacuum cleaner can be cordless. To secure a dust collecting space for storing vacuumed dust inside the vacuum cleaner, a space occupied by a power storage device 7604 is preferably as small as possible. For this reason, it is useful to provide the thin power storage device 7604 that can be bent, between the outside surface and the dust collecting space.

Figure 15B:
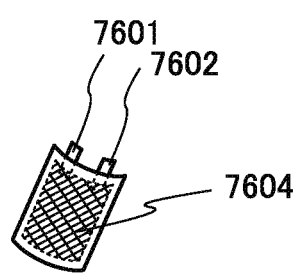

The vacuum cleaner 7600 is provided with operation buttons 7603 and the power storage device 7604. FIG. 15B illustrates the power storage device 7604 that is capable of being bent. A film serving as an exterior body of the power storage device 7604 is embossed, so that the power storage device 7604 has high reliability even when bent. The power storage device 7604 includes a lead electrode 7601 electrically connected to a negative electrode and a lead electrode 7602 electrically connected to a positive electrode.

Figure 15C:
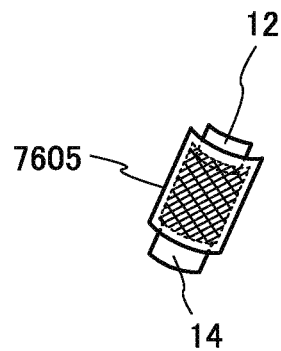

As another example of the power storage device 7604 where two lead electrodes are exposed from one short side of an exterior body, a power storage device 7605 that is capable of being bent is illustrated in FIG. 15C. The power storage device 7605 has a structure in which a current collector or a lead electrode is exposed from each of two short sides of an exterior body. A film serving as the exterior body of the power storage device 7605 may also be embossed, in which case the power storage device 7605 can be bent and have high reliability.

The thin power storage device 7604 can be fabricated by the method for fabricating a laminated secondary battery that is described in any of Embodiments 1 to 3.

The thin power storage device 7604 has a laminated structure and is bent and fixed. The vacuum cleaner 7600 includes a display portion 7606 that displays, for example, the remaining amount of power in the thin power storage device 7604. A display area of the display portion 7606 is curved to fit the shape of the outer surface of the vacuum cleaner. The vacuum cleaner includes a connection cord for being connected to a receptacle. When the thin power storage device 7604 is charged to have sufficient power, the connection cord can be removed from the receptacle to use the vacuum cleaner. The thin power storage device 7604 may be charged wirelessly without using the connection cord.

The use of power storage devices that can be bent in vehicles enables production of next-generation clean energy vehicles such as hybrid electric vehicles (HEVs), electric vehicles (EVs), and plug-in hybrid electric vehicles (PHEVs). Moreover, power storage devices that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 16A:
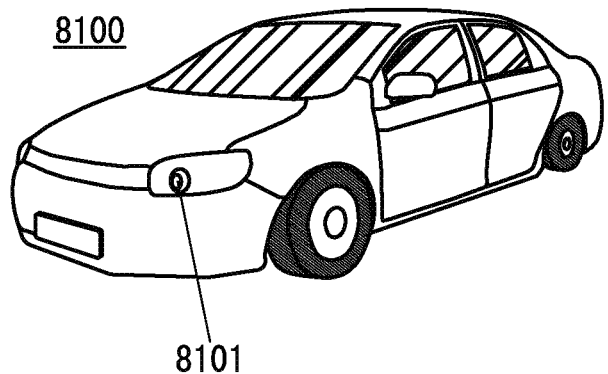
FIGS. 16A and 16B illustrate vehicles including secondary batteries.
Figure 16B:
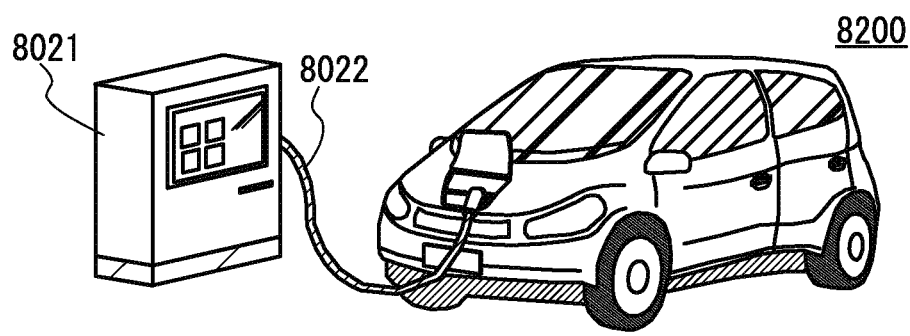

FIGS. 16A and 16B each illustrate an example of a vehicle fabricated according to one embodiment of the present invention. An automobile 8100 illustrated in FIG. 16A is an electric vehicle that runs on the power of an electric motor. Alternatively, the automobile 8100 is a hybrid electric vehicle capable of driving using either the electric motor or the engine as appropriate. In the case of providing a laminated secondary battery in the vehicle, a battery module including a plurality of laminated secondary batteries is placed in one place or more than one place. According to one embodiment of the present invention, a power storage device itself can be made more compact and lightweight, and for example, when the power storage device having a curved surface is provided on the inside of a tire of a vehicle, the vehicle can be a high-mileage vehicle. Furthermore, a power storage device that can have various shapes can be provided in a small space in a vehicle, which allows a space in a trunk and a space for riders to be secured. The automobile 8100 includes the power storage device. The power storage device is used not only to drive the electric motor, but also to supply electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 16B illustrates an automobile 8200 including the power storage device. The automobile 8200 can be charged when the power storage device is supplied with electric power through external charging equipment by a plug-in system, a contactless power feeding system, or the like. In FIG. 16B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the degree of flexibility in place where the power storage device can be provided is increased and thus a vehicle can be designed efficiently. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving radius. Furthermore, the power storage device included in the vehicle can be used as a power source for supplying electric power to products other than the vehicle. In such a case, the use of a commercial power source can be avoided at peak time of electric power demand.

This embodiment can be freely combined with any one of Embodiments 1 to 3.

Note that what is described (or part thereof) in one embodiment can be applied to, combined with, or replaced with different contents in the embodiment and/or what is described (or part thereof) in another embodiment or other embodiments.

Note that in each embodiment, what are described in the embodiment are contents described with reference to a variety of diagrams or contents described with text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As a specific example, a diagram of a circuit including first to fifth transistors is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Furthermore, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<1V) and constitute one embodiment of the invention. For another example, it is possible to take out M layers (M is an integer, where M<1V) from a cross-sectional view in which N layers (N is an integer) are provided and constitute one embodiment of the invention. For another example, it is possible to take out M elements (M is an integer, where M<1V) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

Example 1

In this example, comparison results between friction of an electrode in which an active material layer is provided on both surfaces of a current collector and that of an electrode in which an active material layer is provided on one surface of a current collector will be described with reference to FIGS. 17A to 17C and FIG. 18.

For the comparison of friction, first, a plurality of electrodes were stacked over a glass plate and an electrode in the middle was pulled out.

An actual secondary battery includes, in a region surrounded by an exterior body, a first current collector a surface of which is provided with a negative electrode active material layer, a second current collector a surface of which is provided with a positive electrode active material layer, and a third current collector a surface of which is provided with a negative electrode active material layer. The first to current collectors partly overlap with each other. A separator is provided between the first current collector and the second current collector and between the second current collector and the third current collector.

In this example, a stack having the same structure as the above structure in a secondary battery was used for the experiment.

The maximum value of friction was measured in the following manner: the first to third current collectors were stacked over the glass plate and a load of 42 g/cm$^2$ was applied thereto, and then the current collector the surface of which is provided with the positive electrode active material layer was pulled out in the horizontal direction by a load measuring instrument (RX-2 manufactured by AIKOH ENGINEERING CO., LTD.).

Figure 17A:
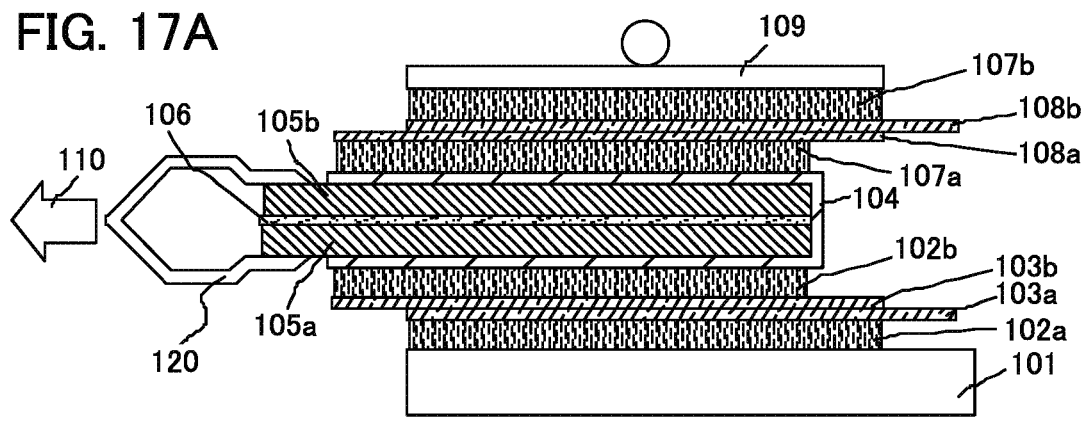
FIGS. 17A to 17C are cross-sectional views and a photograph for explaining Example 1.

FIG. 17A is a schematic cross-sectional view of a sample including a negative electrode in which an active material layer is provided on one surface of a current collector. As illustrated in FIG. 17A, a negative electrode active material layer 102a, a negative electrode current collector 103a, a negative electrode current collector 103b, a negative electrode active material layer 102b, a separator 104, a positive electrode active material layer 105a, a positive electrode current collector 106, a positive electrode active material layer 105b, the separator 104, a negative electrode active material layer 107a, a negative electrode current collector 108a, a negative electrode current collector 108b, and a negative electrode active material layer 107b were stacked over a glass plate 101 in this order. Then, a positive electrode (the positive electrode active material layer 105a, the positive electrode current collector 106, and the positive electrode active material layer 105b) was pulled out in a horizontal direction 110 by a clip 120 while a load 109 was applied, so that friction was measured.

Figure 17B:
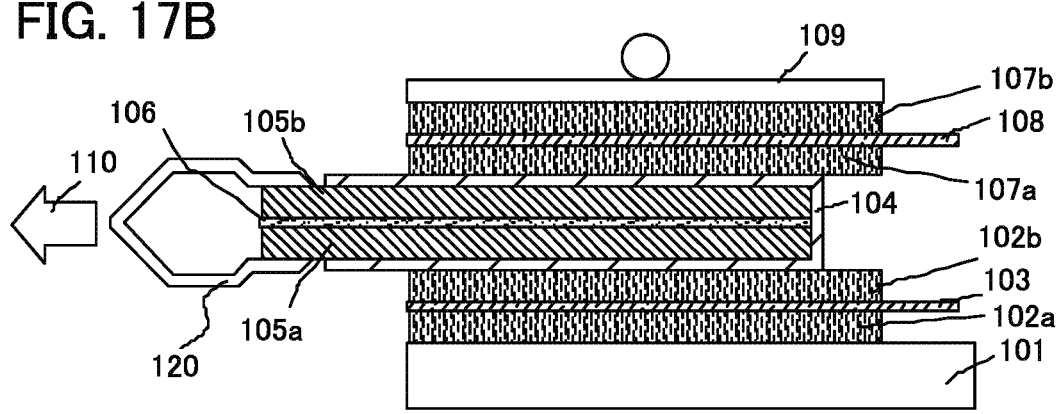

FIG. 17B is a schematic cross-sectional view of a sample including a negative electrode in which an active material layer is provided on both surfaces of a current collector. As illustrated in FIG. 17B, the negative electrode active material layer 102a, a negative electrode current collector 103, the negative electrode active material layer 102b, the separator 104, the positive electrode active material layer 105a, the positive electrode current collector 106, the positive electrode active material layer 105b, the separator 104, the negative electrode active material layer 107a, a negative electrode current collector 108, and the negative electrode active material layer 107b were stacked over the glass plate 101 in this order. Then, a positive electrode (the positive electrode active material layer 105a, the positive electrode current collector 106, and the positive electrode active material layer 105b) was pulled out in a horizontal direction 110 by a clip 120 while a load 109 was applied, so that friction was measured.

Note that the samples in FIGS. 17A and 17B each include a positive electrode in which an active material layer is provided on both surfaces of a current collector. Thus, the positive electrode includes the positive electrode active material layer 105a, the positive electrode current collector 106, and the positive electrode active material layer 105b.

Figure 17C:
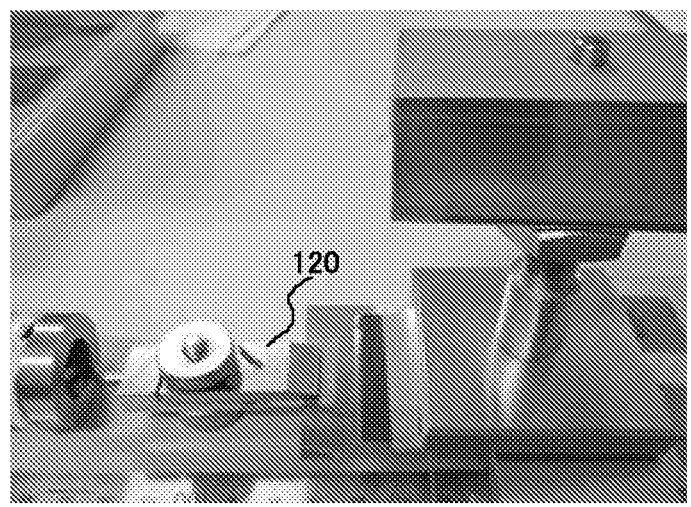
Figure 19A:
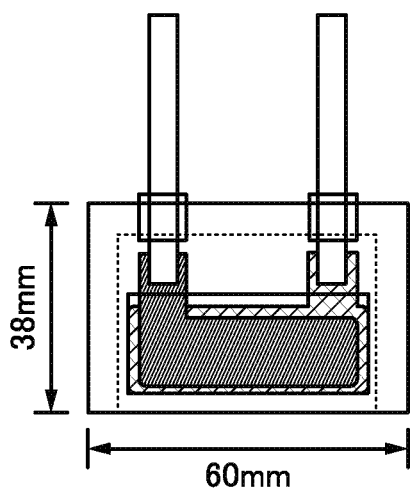
FIGS. 19A to 19D illustrate Example 2.
Figure 19B:
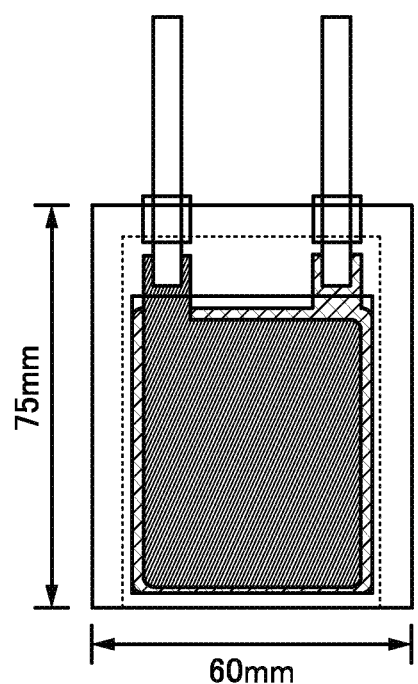
Figure 19C:
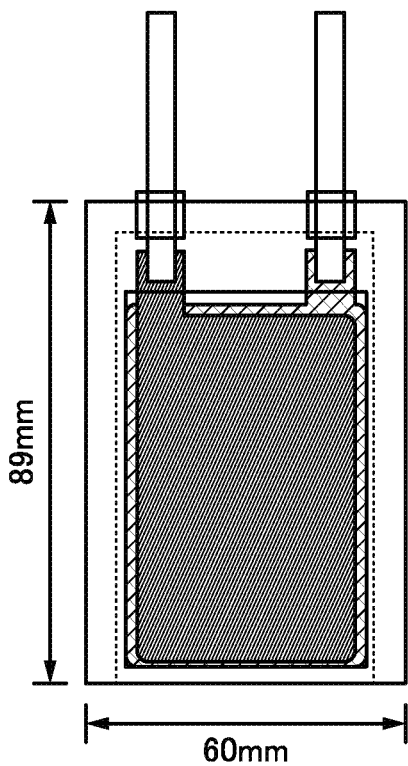
Figure 19D:
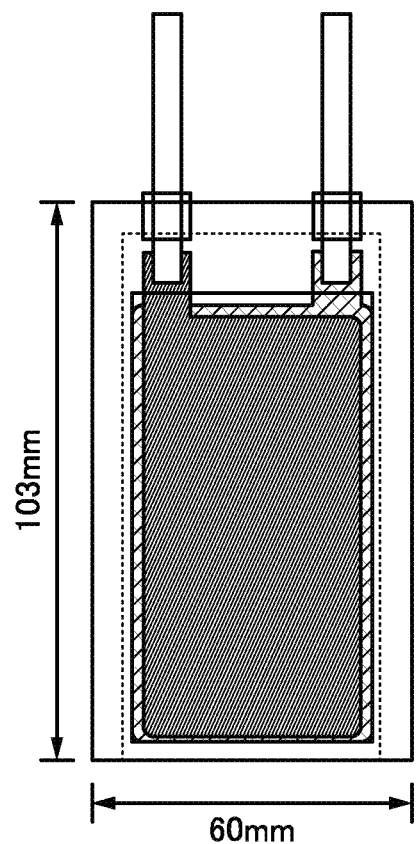
Figure 20:
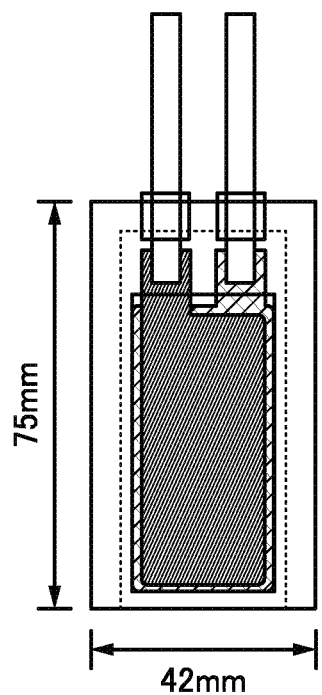
FIG. 20 illustrates Example 2.

FIG. 17C is a photograph of the comparative experiment of friction.

The samples in FIGS. 17A and 17B were also compared under the conditions where the stack was dried and where the stack was wet with an electrolyte solution. The samples were measured three times for each condition. FIG. 18 shows the measurement results.

The results in FIG. 18 show that the secondary battery having the internal structure illustrated in FIG. 17A was easily bent under both the dry and wet conditions. This is because the metal surfaces in contact with each other easily slide on each other owing to the low friction. The results show that the secondary battery including the negative electrode in which the active material layer is provided on one surface of the current collector is easily bent.

Example 2

In this example, experimental results will be described with reference to FIGS. 19A to 19D, FIG. 20, and FIGS. 21A to 21C. In the experiment, a water barrier property examination test was conducted after a thin secondary battery was repeatedly bent with the use of an apparatus shown in FIGS. 21A to 21C to determine whether an exterior body of the secondary battery was damaged by the bending.

Whether the exterior body was damaged or not was determined not only by visual inspection but also by measurement of the amount of moisture in the secondary battery with a Karl Fischer moisture meter. In the case where the amount of moisture exceeded 100 ppm, the sample was determined to have insufficient water barrier property. When the exterior body is heavily damaged by bending and cracked, for example, moisture enters through the damaged portion; thus, the amount of moisture in the secondary battery increases.

As the Karl Fischer moisture meter, an apparatus using a coulometric titration method (MKC-610-DT manufactured by KYOTO ELECTRONICS MANUFACTURING CO., LTD.) was used.

First, twelve samples were fabricated. The twelve samples had different lengths and widths as illustrated in FIGS. 19A to 19D and FIG. 20. In addition, the number of stacked layers, that is, the thickness of the sample, and the radius of curvature of bending were made different.

The samples were fabricated according to Embodiments 1 to 3 in the same manner as the secondary battery whose exterior body is an embossed film. Note that propylene carbonate was provided in a space surrounded by the exterior body of the secondary battery instead of an electrolyte solution, and the amount of moisture in propylene carbonate was measured. For this reason, the samples in this example did not function as secondary batteries and were not able to be charged and discharged; however, charging and discharging are possible if an electrolyte solution is used instead of propylene carbonate. The design capacities in such a case were calculated and shown in Table 1.

TABLE 1

| Number of stacked layers | Cell thickness [mm] | Cell length [mm] | Cell width [mm] | Design capacity [mAh] | Radius of curvature of bending [mm] | Water barrier property |
|---|---|---|---|---|---|---|
| 2 | 1.5 | 75 | 60 | 110 | 40 | OK |
| 6 | 2.5 | 75 | 60 | 330 | 40 | OK |
| 10 | 3.4 | 75 | 60 | 550 | 40 | OK |
| 16 | 4.7 | 75 | 60 | 880 | 40 | NG |
| 6 | 2.5 | 75 | 60 | 330 | 30 | OK |
| 6 | 2.5 | 75 | 60 | 330 | 60 | OK |
| 6 | 2.5 | 75 | 60 | 330 | 100 | OK |
| 6 | 2.5 | 38 | 60 | 86 | 40 | OK |
| 6 | 2.5 | 89 | 60 | 422 | 40 | NG |
| 4 | 2.0 | 103 | 60 | 343 | 40 | NG |
| 6 | 2.5 | 103 | 60 | 515 | 40 | NG |
| 6 | 2.5 | 75 | 42 | 185 | 40 | OK |

Table 2 shows the total thickness of the sample for the corresponding number of stacked current collectors provided in the region surrounded by the exterior body.

TABLE 2

| 2 layers | 1.5 mm |
| 4 layers | 2.0 mm |
| 6 layers | 2.5 mm |
| 10 layers | 3.4 mm |
| 16 layers | 4.7 mm |

Three samples were fabricated for each of the twelve kinds of samples and 10000-time repetitive bending was performed with a bending tester. After that, the samples were held together with water in a container (constant temperature bath) having a pressure adjusting mechanism at 120° C. for 24 hours, and then, the amount of moisture in each sample was measured with the Karl Fischer moisture meter. Table 1 shows the measurement results. In Table 1, "NG" means that at least one out of three samples had an amount of moisture exceeding 100 ppm.

Figure 21A:
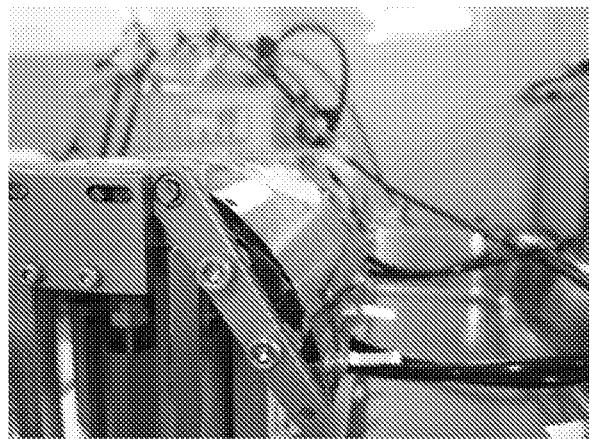
FIGS. 21A to 21C are photographs showing Example 2.
Figure 21B:
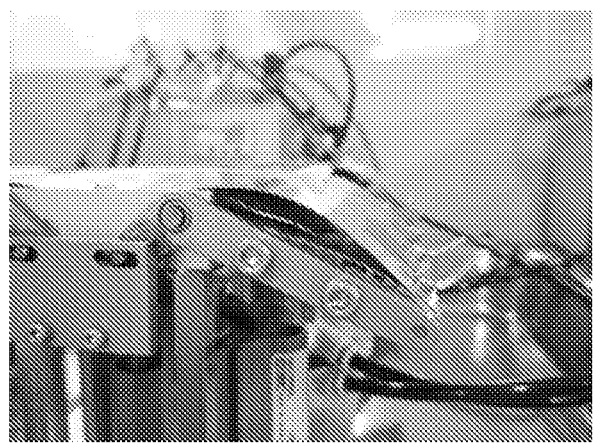

Note that FIGS. 21A and 21B are photographs of a sample bent with the bending tester. The bending tester can set the radius of curvature. In this example, the minimum radius of curvature of bending was set to 30 mm, 40 mm, 60 mm, or 100 mm as shown in Table 1.

The results in Table 1 show that a cell with a length of 75 mm or shorter and a thickness of 3.4 mm or smaller had slight damage of the exterior body and thus retained the water barrier property even after 10000-time repetitive bending.

Figure 21C:
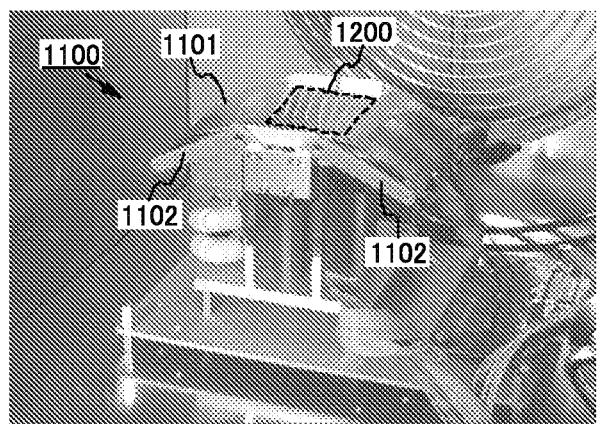

FIG. 21C is a photograph of the appearance of a bending tester 1100. A fabricated lithium-ion secondary battery 1200 was placed on the bending tester 1100. Note that the lithium-ion secondary battery 1200 was sandwiched between two holding plates 1101, and the lithium-ion secondary battery 1200 is shown by a broken line in FIG. 21C. The bending tester 1100 included a cylindrical supporting body (not illustrated) with a radius of curvature of 40 mm extending in the direction perpendicular to the arm 1102 under the lithium-ion secondary battery 1200 in a center portion. The bending tester 1100 also includes arms 1102 extending in the right and left directions. End portions of the arms 1102 are mechanically connected to holding plates 1101. By moving the end portions of the arms 1102 up or down, the holding plates 1101 can be bent along the supporting body. The bending test of the lithium-ion secondary battery 1200 was performed with the lithium-ion secondary battery 1200 sandwiched between the two holding plates 1101. Thus, moving the end portions of the arms 1102 up or down allows the lithium-ion secondary battery 1200 to be bent repeatedly along the cylindrical supporting body. Specifically, lowering the end portions of the arms 1102 permits the lithium-ion secondary battery 1200 to be bent with a radius of curvature of 40 mm. Since the lithium-ion secondary battery 1200 was bent repeatedly while being sandwiched between the two holding plates 1101, unnecessary force except repetitive bending force was able to be prevented from being applied to the lithium-ion secondary battery 1200. Furthermore, repetitive bending force was able to be uniformly applied to the whole lithium-ion secondary battery 1200.

Example 3

In this example, measurement results of a load necessary for bending each of a secondary battery including an electrode in which an active material layer is provided on one surface of a current collector and a secondary battery including an electrode in which an active material layer is provided on both surfaces of a current collector will be described with reference to FIGS. 22A and 22B and FIGS. 23A and 23B.

First, a sample of the secondary battery including the electrode in which the active material layer was provided on one surface of the current collector and a sample of the secondary battery in which the active material layer was provided on both surfaces of the current collector were prepared.

The specific structures of the secondary batteries were as follows. In the sample in which an active material layer was provided on one surface of a current collector, six positive electrode current collectors 1904 in each of which one surface was provided with a positive electrode active material layer 1905, four negative electrode current collectors 1902 in each of which one surface was provided with a negative electrode active material layer 1903, and six separators 1906 were sandwiched between two negative electrode current collectors 1902 in each of which one surface was provided with the negative electrode active material layer 1903.

In the sample in which an active material layer was provided on both surfaces of a current collector, three positive electrode current collectors 1904 whose both surfaces were provided with the positive electrode active material layer 1905, two negative electrode current collectors 1902 whose both surfaces were provided with the negative electrode active material layer 1903, and six separators 1906 were sandwiched between two negative electrode current collectors 1902 in each of which one surface was provided with the negative electrode active material layer 1903.

Figure 22A:
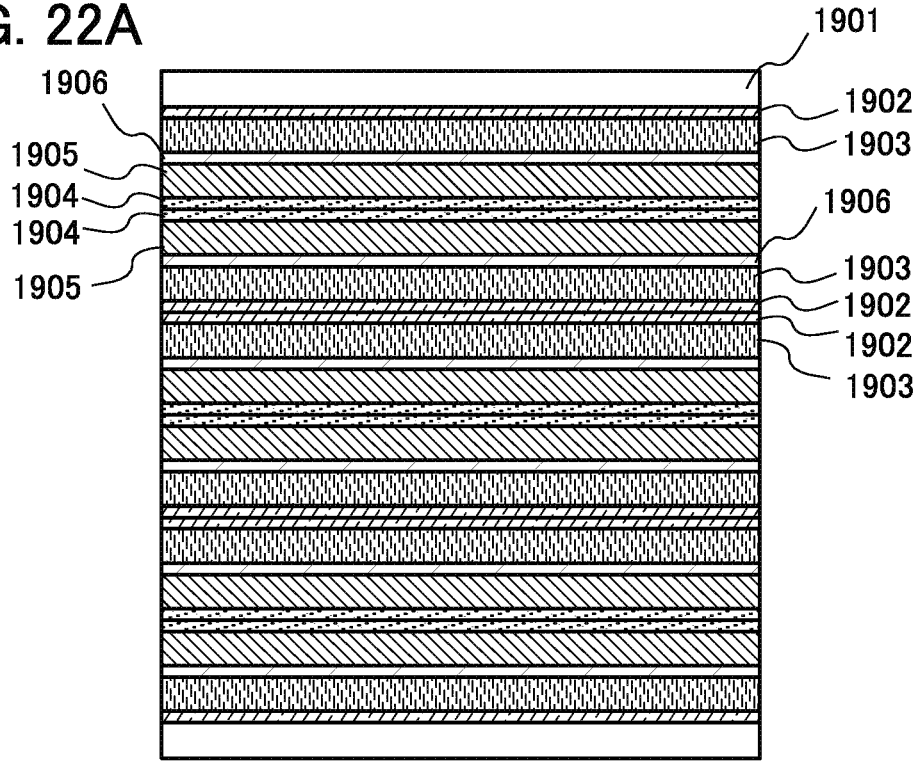
FIGS. 22A and 22B illustrate Example 3.

FIG. 22A is a schematic cross-sectional view of the sample in which an active material layer was provided on one surface of a current collector. As illustrated in FIG. 22A, the negative electrode current collector 1902, the negative electrode active material layer 1903, the separator 1906, the positive electrode active material layer 1905, the positive electrode current collector 1904, the positive electrode current collector 1904, the positive electrode active material layer 1905, the separator 1906, the negative electrode active material layer 1903, the negative electrode current collector 1902, the negative electrode current collector 1902, the negative electrode active material layer 1903, the separator 1906, the positive electrode active material layer 1905, the positive electrode current collector 1904, the positive electrode current collector 1904, the positive electrode active material layer 1905, the separator 1906, the negative electrode active material layer 1903, the negative electrode current collector 1902, the negative electrode current collector 1902, the negative electrode active material layer 1903, the separator 1906, the positive electrode active material layer 1905, the positive electrode current collector 1904, the positive electrode current collector 1904, the positive electrode active material layer 1905, the separator 1906, the negative electrode active material layer 1903, and the negative electrode current collector 1902 were stacked in this order to fabricate a secondary battery with a thickness of approximately 2 mm.

Figure 22B:
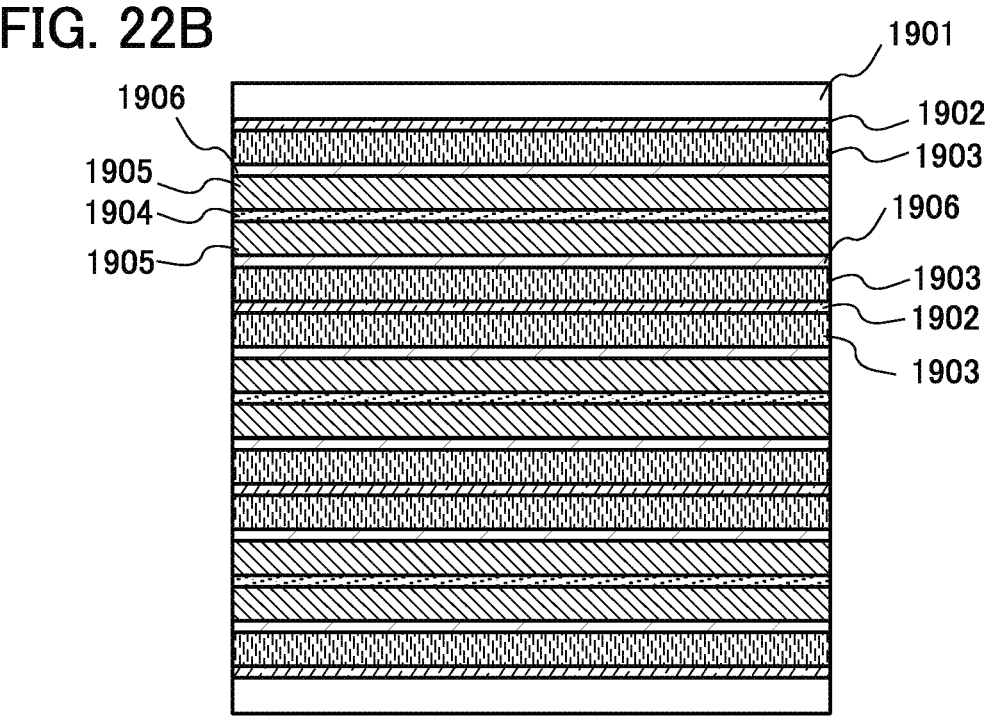

FIG. 22B is a schematic cross-sectional view of the sample in which an active material layer was provided on both surfaces of a current collector. As illustrated in FIG. 22B, the negative electrode current collector 1902, the negative electrode active material layer 1903, the separator 1906, the positive electrode active material layer 1905, the positive electrode current collector 1904, the positive electrode active material layer 1905, the separator 1906, the negative electrode active material layer 1903, the negative electrode current collector 1902, the negative electrode active material layer 1903, the separator 1906, the positive electrode active material layer 1905, the positive electrode current collector 1904, the positive electrode active material layer 1905, the separator 1906, the negative electrode active material layer 1903, the negative electrode current collector 1902, the negative electrode active material layer 1903, the separator 1906, the positive electrode active material layer 1905, the positive electrode current collector 1904, the positive electrode active material layer 1905, the separator 1906, the negative electrode active material layer 1903, and the negative electrode current collector 1902 were stacked in this order to fabricate a secondary battery with a thickness of approximately 2 mm.

Next, each sample was sandwiched between jigs 1400 having curved surfaces, and a load was applied with a tester 1410 (EZ Graph manufactured by Shimadzu Corporation) in the following manner: a jig 1401 was moved toward a jig 1402 such that the flat sample had a displacement of 6 mm/min. until the radius of curvature became approximately 40 mm. Note that the sample was curved in a direction parallel to a direction in which a lead electrode was extracted.

Figure 23A:
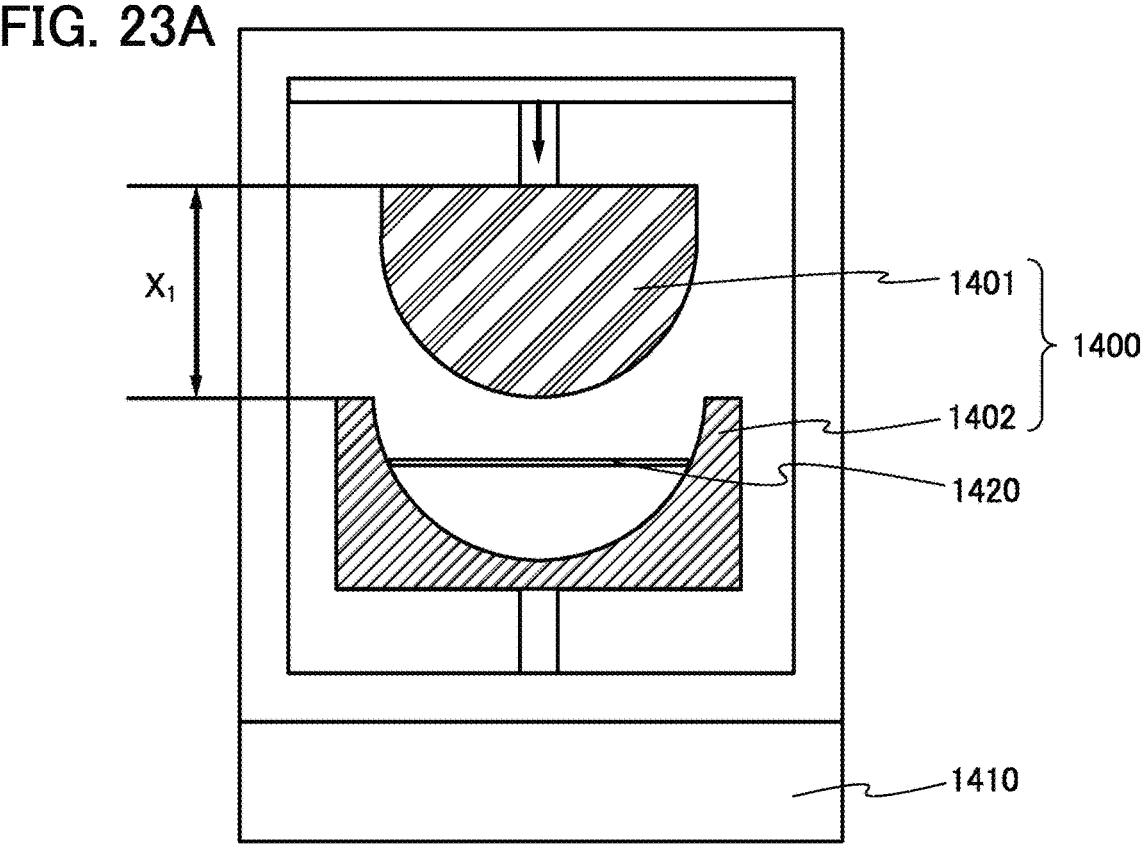
FIGS. 23A and 23B illustrate Examples 3 and 4.
Figure 23B:
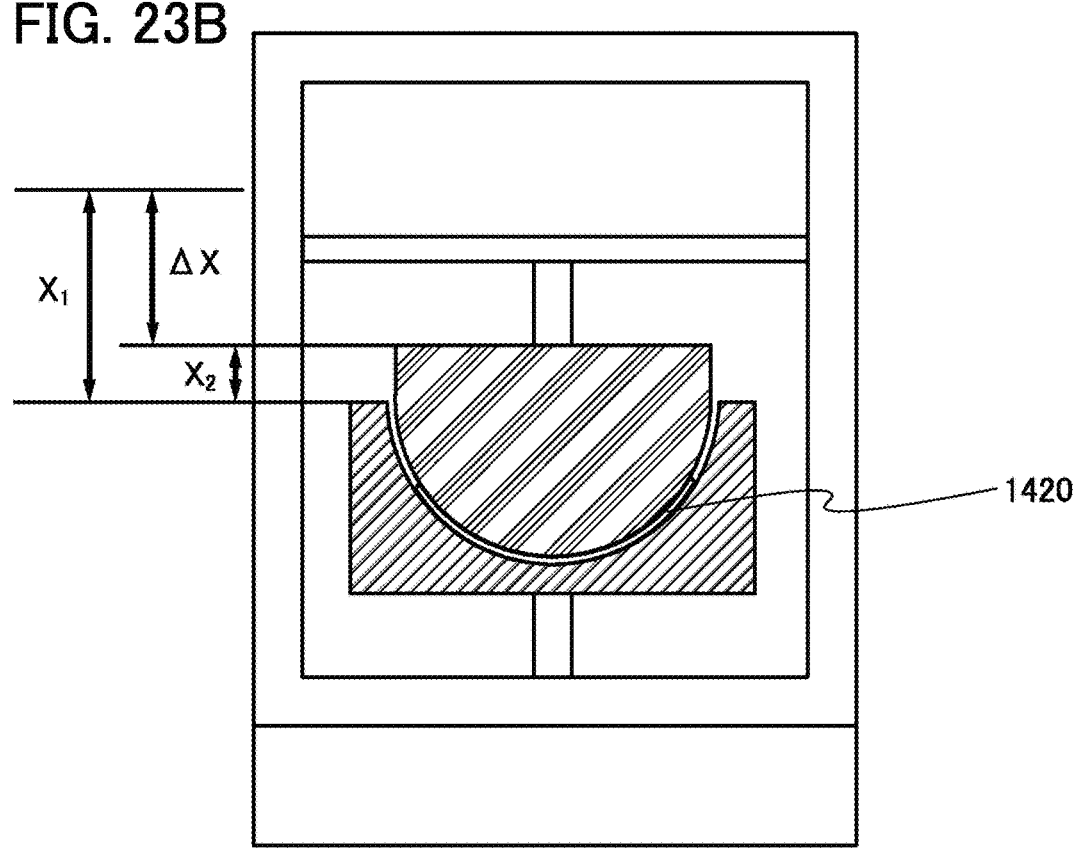

FIGS. 23A and 23B are schematic views of the jigs 1400 having curved surfaces and the tester 1410. In the jigs 1400 having curved surfaces, the jig 1401 in contact with an inner surface of a curved sample 1420 has a projection with a radius of curvature of 40 mm, and the jig 1402 in contact with an outer surface of the curved sample 1420 has a depression with a radius of curvature of 42 mm.

In FIGS. 23A and 23B, $X_1$ is the maximum distance between upper surfaces of the jigs 1401 and 1402. In FIG. 23B, $X_2$ is the minimum distance between the upper surfaces of the jigs 1401 and 1402, and $\Delta X$ is the difference between $X_1$ and $X_2$, which is the distance through which the jig 1401 actually moves.

The cell was curved in the following manner: the jig 1401 which was to be in contact with the inner surface of the curved sample and the jig 1402 which was to be in contact with the outer surface of the curved sample were connected to the tester 1410; the sample 1420 was positioned on the jig 1402 which was to be in contact with the outer surface; and a load was applied to the sample 1420 sandwiched between the jigs 1400 in a direction of an arrow (compression direction) in FIG. 23A with the tester 1410. In this manner, a load necessary for bending the sample until the radius of curvature became 40 mm as illustrated in FIG. 23B was measured.

Figure 24:
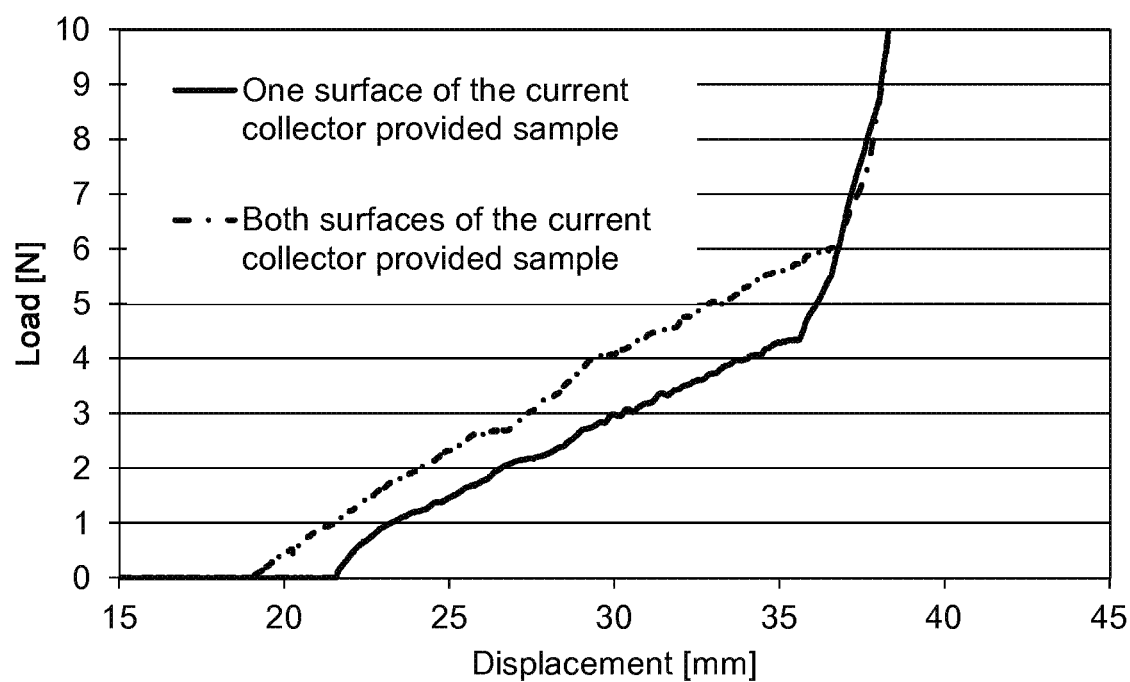
FIG. 24 is a graph showing data of a load test in Example 3.

FIG. 24 shows the measurement results of loads necessary for curving sample in which an active material layer was provided on one surface of a current collector and the sample in which an active material layer was provided on both surfaces of a current collector until the radius of curvature became 40 mm. The solid line indicates the result for the sample in which an active material layer was provided on one surface of a current collector, and a dashed-dotted line indicates the result for the sample in which an active material layer was provided on both surfaces of a current collector. Note that "displacement" shown by the lateral axis is the distance through which the jig 1401 in the jigs 1400 in contact with the inner surface of the sample moves, which is $\Delta X$ in FIG. 23B. The displacement is 0 mm when the distance between the jigs 1400 is 40 mm and the sample is not curved, and the displacement 40 mm when the contact area of the sample and the jigs 1400 becomes the maximum and the measurement terminates. The displacement can also be referred to as the displacement amount, the moved distance, and the like.

As shown in the graph in FIG. 24, a load necessary for curving each sample starts to rapidly increase at a certain displacement. This is because thin portions such as tab portions of a positive electrode and a negative electrode were curved first and then a thick portion including the active material layer was curved.

The results shown in FIG. 24 show that the secondary battery including the electrode in which the active material layer was provided on one surface of the current collector was curved with a small load as compared with the secondary battery including the electrode in which the active material layer was provided on both surfaces of the current collector. This is because the metal surfaces in contact with each other easily slide on each other owing to the low friction. The results show that the secondary battery including the negative electrode in which the active material layer is provided on one surface of the current collector is easily curved.

Example 4

In this example, measurement results of loads for curving thin secondary batteries having different thicknesses will be described.

First, two samples A, two samples B, and two samples C were fabricated. Two layers were stacked in the sample A (thickness: 1.5 mm), six layers were stacked in the sample B (thickness: 2.5 mm), and ten layers were stacked in the sample C (thickness: 3.4 mm). Note that "two layers were stacked" means two positive electrodes and two negative electrodes were stacked.

The fabrication conditions for the sample in Example 2 with a length of 75 mm and a width of 60 mm were employed for the samples A, B, and C, except for the number of stacked layers. Table 3 shows the conditions of the samples A, B, and C.

TABLE 3

| Sample | Number of stacked layers | Thickness [mm] | Length [mm] | Width [mm] | Design capacity [mAh] | Radius of curvature of bending [mm] |
|---|---|---|---|---|---|---|
| A | 2 | 1.5 | 75 | 60 | 110 | 40 |
| B | 6 | 2.5 | 75 | 60 | 330 | 40 |
| C | 10 | 3.4 | 75 | 60 | 550 | 40 |

Next, each of the samples A, B, and C was sandwiched between jigs 1400 having curved surfaces, and a load was applied with the tester 1410 (EZ Graph manufactured by Shimadzu Corporation) in the following manner: the jig 1401 was moved toward the jig 1402 such that the flat sample had the displacement of 6 mm/min. until the radius of curvature became approximately 40 mm. Note that the cell was curved in a direction parallel to a direction in which a lead electrode was extracted.

The load was measured with a tester and jigs similar to those used in Example 3.

Figure 25A:
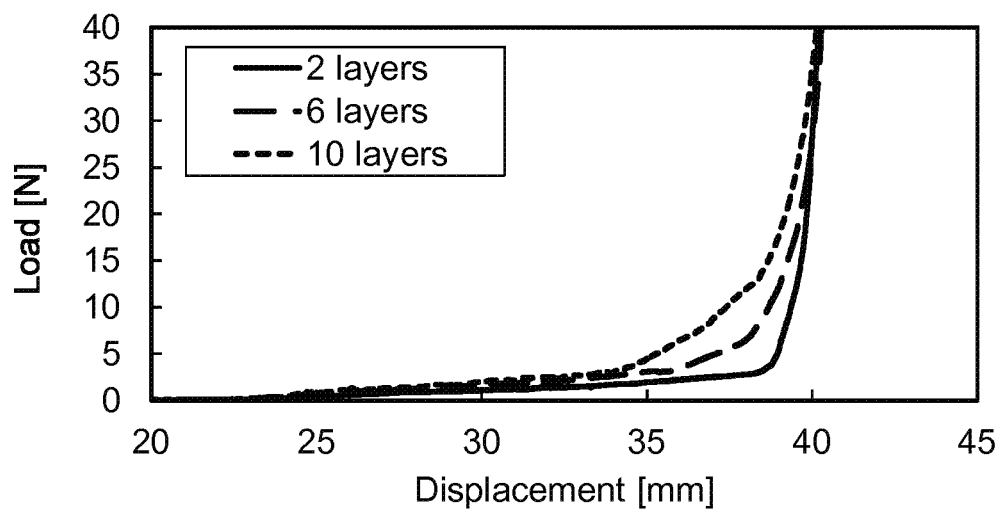
FIGS. 25A and 25B are each a graph showing data of a load test in Example 4.

FIG. 25A shows the measurement results of loads necessary for curving the samples A, B, and C until the radius of curvature became 40 mm. A solid line indicates the result of the sample A (the number of stacked layers: 2, thickness: 1.5 mm), a dashed line indicates the result of the sample B (the number of stacked layers: 6, thickness: 2.5 mm), and a dotted line indicates the result of the sample C (the number of stacked layers: 10, thickness: 3.4 mm). For simplification of the graph, FIG. 25A shows the results of one sample A, one sample B, and one sample C.

As shown in the graph in FIG. 25A, a load necessary for curving each sample starts to rapidly increase at a certain displacement. This is because thin portions such as tab portions of a positive electrode and a negative electrode were curved first and then a thick portion including the active material layer was curved.

Figure 25B:
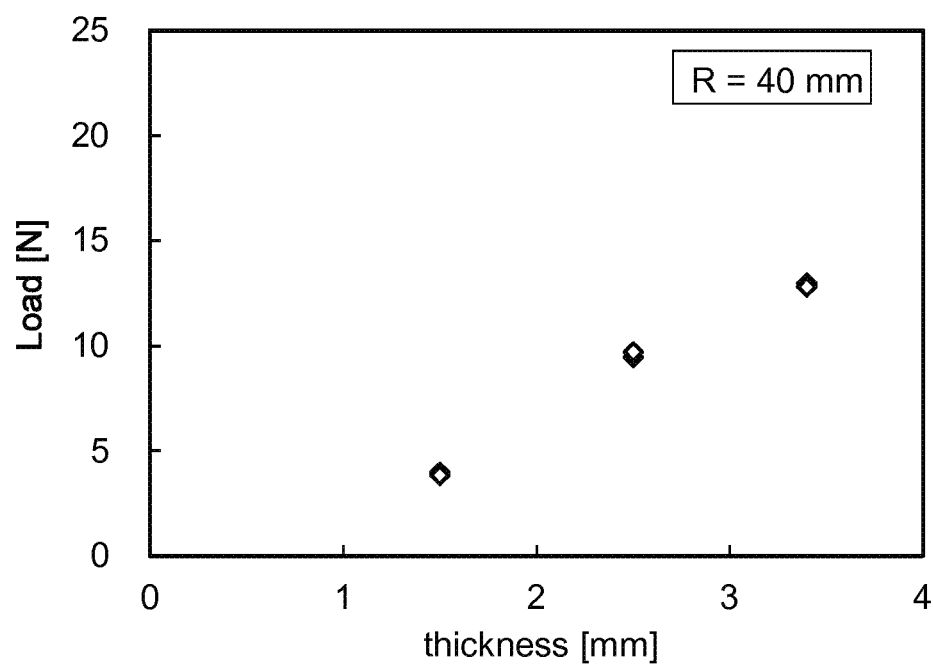

Points where the slopes of the curves of the samples A, B, and C in FIG. 25A starts to rapidly increase (points where the slopes of the curves exceed 6 N/mm) are regarded as load values necessary for curving the thick portion including the active material layer. In FIG. 25B, a point where the slope exceeds 6 N/mm is plotted for each of the samples A, B, and C, where a lateral axis represents the thickness of the sample.

As is obvious from FIG. 25B, the thicker the sample is, the more the load is necessary for curving the sample, specifically, the thick portion including the active material layer.

EXPLANATION OF REFERENCE

10: film, 10a: film, 10b: film, 11: film, 11a: film, 11b: film, 12: positive electrode current collector, 13: separator, 14: negative electrode current collector, 15: sealing layer, 16: lead electrode, 17: thermocompression-bonded region, 18: positive electrode active material layer, 19: negative electrode active material layer, 20: electrolyte solution, 21: region, 22: film, 23: film, 24: film, 30: adhesive layer, 40: secondary battery, 50: film, 51: film, 52: film, 53: embossing roll, 54: roll, 55: embossing roll, 56: embossing roll, 57: embossing roll, 58: embossing roll, 60: direction, 70: components, 71: film, 72: film, 72a: film, 72b: film, 72c: film, 80: plane, 90: plane, 101: glass plate, 102a: negative electrode active material layer, 102b: negative electrode active material layer, 103: negative electrode current collector, 103a: negative electrode current collector, 103b: negative electrode current collector, 104: separator, 105a: positive electrode active material layer, 105b: positive electrode active material layer, 106: positive electrode current collector, 107a: negative electrode active material layer, 107b: negative electrode active material layer, 108: negative electrode current collector, 108a: negative electrode current collector, 108b: negative electrode current collector, 109: load, 110: horizontal direction, 120: clip, 1100: tester, 1101: holding plate, 1102: arm, 1200: lithium-ion secondary battery, 1301: vertical stripe pattern, 1302: horizontal stripe pattern, 1400: jig, 1401: jig, 1402: jig, 1410: tester, 1420: sample, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 1805: electrodes and electrolyte solution, 1901: exterior body, 1902: negative electrode current collector, 1903: negative electrode active material layer, 1904: positive electrode current collector, 1905: positive electrode active material layer, 1906: separator, 7100: mobile phone, 7101: housing, 7102: display portion, 7103: operation button, 7104: power storage device, 7105: lead electrode, 7106: current collector, 7400: mobile phone, 7401: housing, 7402: display portion, 7403: operation button, 7404: external connection port, 7405: speaker, 7406: microphone, 7407: power storage device, 7408: lead electrode, 7409: current collector, 7600: vacuum cleaner, 7601: lead electrode, 7602: lead electrode, 7603: operation button, 7604: power storage device, 7605: power storage device, 7606: display portion, 8021: charging device, 8022: cable, 8100: automobile, 8101: headlight, and 8200: automobile.

This application is based on Japanese Patent Application serial no. 2014-111114 filed with Japan Patent Office on May 29, 2014, Japanese Patent Application serial no. 2014-133121 filed with Japan Patent Office on Jun. 27, 2014, Japanese Patent Application serial no. 2014-264017 filed with Japan Patent Office on Dec. 26, 2014, and Japanese Patent Application serial no. 2015-005404 filed with Japan Patent Office on Jan. 14, 2015, the entire contents of which are hereby incorporated by reference.

What is claimed is:
1. A secondary battery comprising:
a first film;
a second film; and
a stacked layer comprising:
 a first negative electrode current collector;
 a first negative electrode active material layer on the first negative electrode current collector;

a first separator on the first negative electrode active material layer;

a first positive electrode active material layer on the first separator;

a first positive electrode current collector on the first positive electrode active material layer;

a second positive electrode current collector on the first positive electrode current collector;

a second positive electrode active material layer on the second positive electrode current collector;

a second separator on the second positive electrode active material layer;

a second negative electrode active material layer on the second separator; and a second negative electrode current collector on the second negative electrode active material layer, wherein each of an inside surface and an outside surface of the first film has a first pattern of depressions or projections with a first pitch, wherein each of an inside surface and an outside surface of the second film has a second pattern of depressions or projections with a second pitch, wherein the first pitch is smaller than the second pitch, wherein the stacked layer is positioned inside the first film and the second film, and wherein the secondary battery is capable of deforming.

2. The secondary battery according to claim 1, wherein one of the depressions of the outside surface of the first film and one of the projections of the inside surface of the first film are adjacent to each other.

3. The secondary battery according to claim 1, wherein one of the projections of the outside surface of the first film and one of the depressions of the inside surface of the first film are adjacent to each other.

4. A secondary battery comprising:
a first film;
a second film; and
a stacked layer comprising:
   a first negative electrode current collector;
   a first negative electrode active material layer on the first negative electrode current collector;
   a first separator on the first negative electrode active material layer;
   a first positive electrode active material layer on the first separator;
   a first positive electrode current collector on the first positive electrode active material layer;
   a second positive electrode current collector on the first positive electrode current collector;
   a second positive electrode active material layer on the second positive electrode current collector;
   a second separator on the second positive electrode active material layer;
   a second negative electrode active material layer on the second separator; and
   a second negative electrode current collector on the second negative electrode active material layer,
wherein each of an inside surface and an outside surface of the first film has a first pattern of depressions or projections with a first pitch,
wherein each of an inside surface and an outside surface of the second film has a second pattern of depressions or projections with a second pitch,
wherein the first pitch is smaller than the second pitch,
wherein the stacked layer is positioned inside the first film and the second film.

5. The secondary battery according to claim 1,
wherein one of the depressions of the outside surface of the first film and one of the projections of the inside surface of the first film are adjacent to each other.

6. The secondary battery according to claim 1,
wherein one of the projections of the outside surface of the first film and one of the depressions of the inside surface of the first film are adjacent to each other.

\* \* \* \* \*